(12) United States Patent
Kim et al.

(10) Patent No.: US 12,520,135 B2
(45) Date of Patent: Jan. 6, 2026

(54) TRIGGERING OF UNMANNED AERIAL VEHICLE AUTHENTICATION AND AUTHORIZATION PROCEDURE

(71) Applicant: QUALCOMM Incorporated, San Diego, CA (US)

(72) Inventors: Sunghoon Kim, Seoul (KR); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 17/444,681

(22) Filed: Aug. 9, 2021

(65) Prior Publication Data

US 2022/0053329 A1  Feb. 17, 2022

Related U.S. Application Data

(60) Provisional application No. 62/706,371, filed on Aug. 12, 2020.

(51) Int. Cl.
| | | |
|---|---|---|
| *H04W 12/08* | (2021.01) | |
| *G06F 21/10* | (2013.01) | |
| *H04L 9/40* | (2022.01) | |
| *H04W 8/02* | (2009.01) | |
| *H04W 12/06* | (2021.01) | |

(Continued)

(52) U.S. Cl.
CPC ............ *H04W 12/06* (2013.01); *G06F 21/10* (2013.01); *H04L 63/205* (2013.01); *H04W 8/02* (2013.01); *H04W 12/71* (2021.01)

(58) Field of Classification Search
CPC ........ H04W 4/50–80; H04W 8/02–245; H04L 63/205
See application file for complete search history.

(56) References Cited

U.S. PATENT DOCUMENTS

2021/0103294 A1*  4/2021  Mahkonen ............... G08G 5/59
2021/0206492 A1*  7/2021  Faccin ................... H04W 4/021
(Continued)

FOREIGN PATENT DOCUMENTS

| EP | 3471464 A1 | 4/2019 |
|---|---|---|
| WO | 2018178752 A1 | 10/2018 |
| WO | 2020033905 A1 | 2/2020 |

OTHER PUBLICATIONS

International Search Report and Written Opinion—PCT/US2021/071147—ISA/EPO—Nov. 26, 2021.

*Primary Examiner* — San Htun
(74) *Attorney, Agent, or Firm* — Harrity & Harrity, LLP

(57) ABSTRACT

Various aspects of the present disclosure generally relate to wireless communication. In some aspects, an unmanned aerial vehicle (UAV) user equipment (UE) may perform a registration procedure with a UAV service supplier (USS) device via a network connection to register with the USS device. The UAV UE may perform a registration procedure with a core network device to register with a network associated with the core network device based at least in part on performing the registration procedure with the USS device. The UAV UE may receive, from the core network device, an indication to perform an authentication and authorization procedure only after performing the registration procedure with the USS device and after performing the registration procedure with the core network device. Numerous other aspects are provided.

30 Claims, 13 Drawing Sheets

(51) Int. Cl.
*H04W 12/71* (2021.01)
*H04W 84/06* (2009.01)

(56) References Cited

U.S. PATENT DOCUMENTS

| | | | |
|---|---|---|---|
| 2021/0259045 A1* | 8/2021 | Prabhakar | G08G 5/0013 |
| 2021/0274311 A1* | 9/2021 | Mahkonen | G08G 5/55 |
| 2021/0360386 A1* | 11/2021 | Grafulla-González | H04W 8/205 |
| 2022/0086741 A1* | 3/2022 | Liao | H04W 4/44 |
| 2022/0191699 A1* | 6/2022 | Zhu | G08G 5/0026 |
| 2022/0277657 A1* | 9/2022 | Xiang | G08G 5/22 |
| 2022/0279355 A1* | 9/2022 | Roy | H04W 12/50 |
| 2022/0369363 A1* | 11/2022 | Ferdi | H04W 4/44 |
| 2023/0232204 A1* | 7/2023 | Ryu | H04W 8/18 370/329 |

\* cited by examiner

TRIGGERING OF UNMANNED AERIAL VEHICLE AUTHENTICATION AND AUTHORIZATION PROCEDURE

CROSS-REFERENCE TO RELATED APPLICATION

This Patent Application claims priority to U.S. Provisional Patent Application No. 62/706,371, filed on Aug. 12, 2020, entitled "TRIGGERING OF UNMANNED AERIAL VEHICLE AUTHENTICATION AND AUTHORIZATION PROCEDURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for triggering of an unmanned aerial vehicle (UAV) authentication and authorization procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by an unmanned aerial vehicle (UAV) user equipment (UE) includes: performing a registration procedure with a UAV service supplier (USS) device via a network connection to register with the USS device; performing a registration procedure with a core network device to register with a network associated with the core network device based at least in part on performing the registration procedure with the USS device; and receiving, from the core network device, an indication to perform an authentication and authorization procedure only after performing the registration procedure with the USS device and after performing the registration procedure with the core network device.

In some aspects, a method of wireless communication performed by a network device includes: receiving, from a USS device, one or more parameters associated with a registration of a UAV UE with the USS device; and performing an action to cause a core network device to initiate an authentication and authorization procedure with the UAV UE.

In some aspects, a method of wireless communication performed by a core network device includes receiving, from a network device, one or more parameters associated with registration of a UAV UE with a USS device; and performing an action to initiate an authentication and authorization procedure with the UAV UE.

In some aspects, a method of wireless communication performed by a USS device includes: performing a registration procedure with a UAV UE to register the UAV UE with the USS device; and performing an action to cause a core network device to initiate an authentication and authorization procedure with the UAV UE.

In some aspects, a UAV UE for wireless communication includes a memory and one or more processors, coupled to the memory, configured to: perform a registration procedure with a USS device via a network connection to register with the USS device; perform a registration procedure with a core network device to register with a network associated with the core network device based at least in part on performing the registration procedure with the USS device; and receive, from the core network device, an indication to perform an authentication and authorization procedure only after performing the registration procedure with the USS device and after performing the registration procedure with the core network device.

In some aspects, a network device for wireless communication includes a memory and one or more processors, coupled to the memory, configured to: receive, from a USS device, one or more parameters associated with a registration of a UAV UE with the USS device; and perform an action to cause a core network device to initiate an authentication and authorization procedure with the UAV UE.

In some aspects, a core network device for wireless communication includes a memory and one or more processors, coupled to the memory, configured to: receive, from a network device, one or more parameters associated with registration of a UAV UE with a USS device; and perform an action to initiate an authentication and authorization procedure with the UAV UE.

In some aspects, a USS device for wireless communication includes a memory and one or more processors, coupled to the memory, configured to: perform a registration procedure with a UAV UE to register the UAV UE with the USS device; and perform an action to cause a core network device to initiate an authentication and authorization procedure with the UAV UE.

In some aspects, a non-transitory computer-readable medium storing a set of instructions for wireless communication includes: one or more instructions that, when executed by one or more processors of a UAV UE, cause the UAV UE to: perform a registration procedure with a USS device via a network connection to register with the USS device; perform a registration procedure with a core network device to register with a network associated with the core network device based at least in part on performing the registration procedure with the USS device; and receive, from the core network device, an indication to perform an authentication and authorization procedure only after performing the registration procedure with the USS device and after performing the registration procedure with the core network device.

In some aspects, a non-transitory computer-readable medium storing a set of instructions for wireless communication includes: one or more instructions that, when executed by one or more processors of a network device, cause the network device to: receive, from a USS device, one or more parameters associated with a registration of a UAV UE with the USS device; and perform an action to cause a core network device to initiate an authentication and authorization procedure with the UAV UE.

In some aspects, a non-transitory computer-readable medium storing a set of instructions for wireless communication includes: one or more instructions that, when executed by one or more processors of a core network device, cause the core network device to: receive, from a network device, one or more parameters associated with registration of a UAV UE with a USS device; and perform an action to initiate an authentication and authorization procedure with the UAV UE.

In some aspects, a non-transitory computer-readable medium storing a set of instructions for wireless communication includes: one or more instructions that, when executed by one or more processors of a USS device, cause USS device to: perform a registration procedure with a UAV UE to register the UAV UE with the USS device; and perform an action to cause a core network device to initiate an authentication and authorization procedure with the UAV UE.

In some aspects, an apparatus for wireless communication includes: means for performing a registration procedure with a USS device via a network connection to register with the USS device; means for performing a registration procedure with a core network device to register with a network associated with the core network device based at least in part on performing the registration procedure with the USS device; and means for receiving, from the core network device, an indication to perform an authentication and authorization procedure only after performing the registration procedure with the USS device and after performing the registration procedure with the core network device.

In some aspects, an apparatus for wireless communication includes: means for receiving, from a USS device, one or more parameters associated with a registration of a UAV UE with the USS device; and means for performing an action to cause a core network device to initiate an authentication and authorization procedure with the UAV UE.

In some aspects, an apparatus for wireless communication includes means for receiving, from a network device, one or more parameters associated with registration of a UAV UE with a USS device; and means for performing an action to initiate an authentication and authorization procedure with the UAV UE.

In some aspects, an apparatus for wireless communication includes: means for performing a registration procedure with a UAV UE to register the UAV UE with the apparatus; and means for performing an action to cause a core network device to initiate an authentication and authorization procedure with the UAV UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
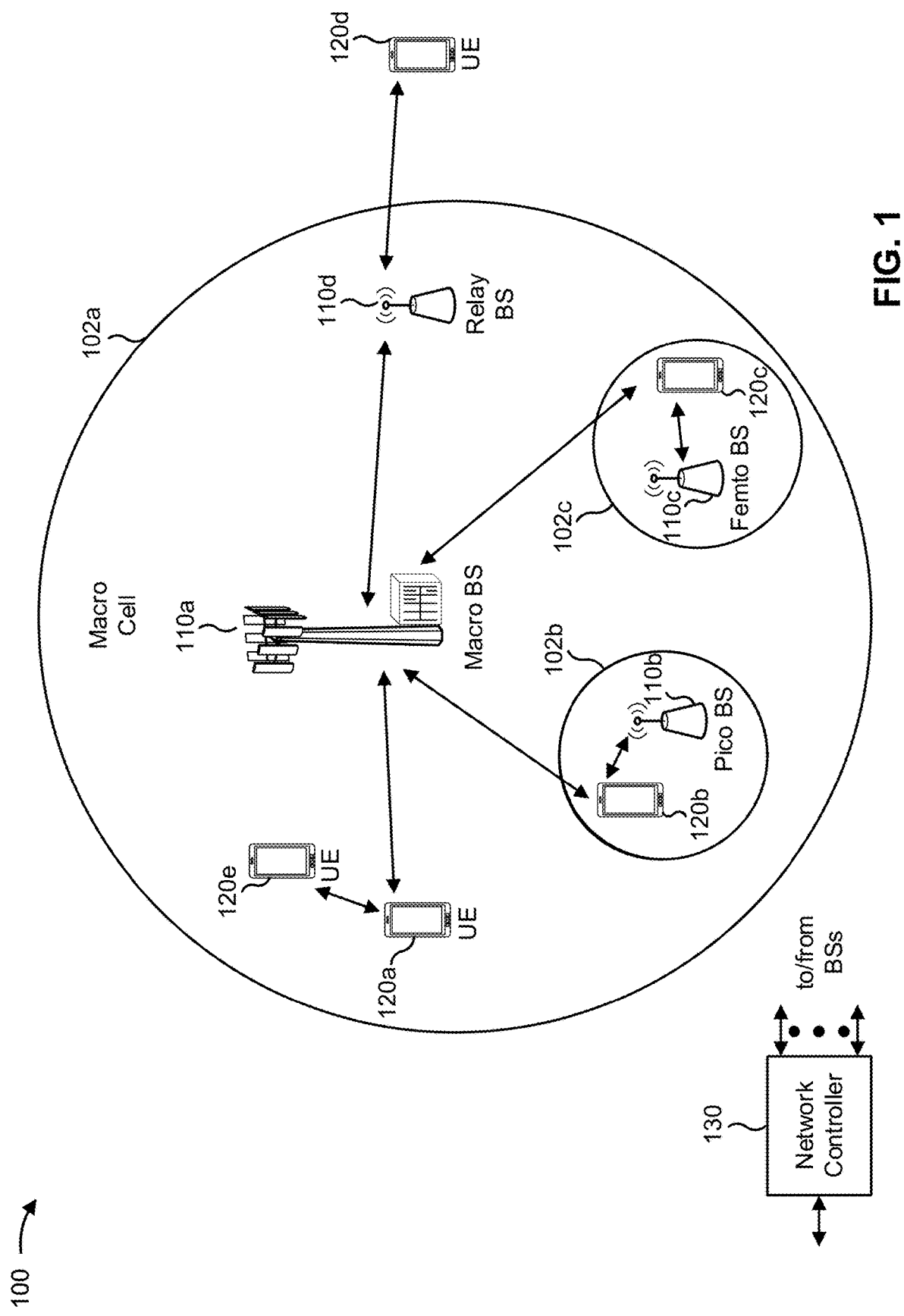
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
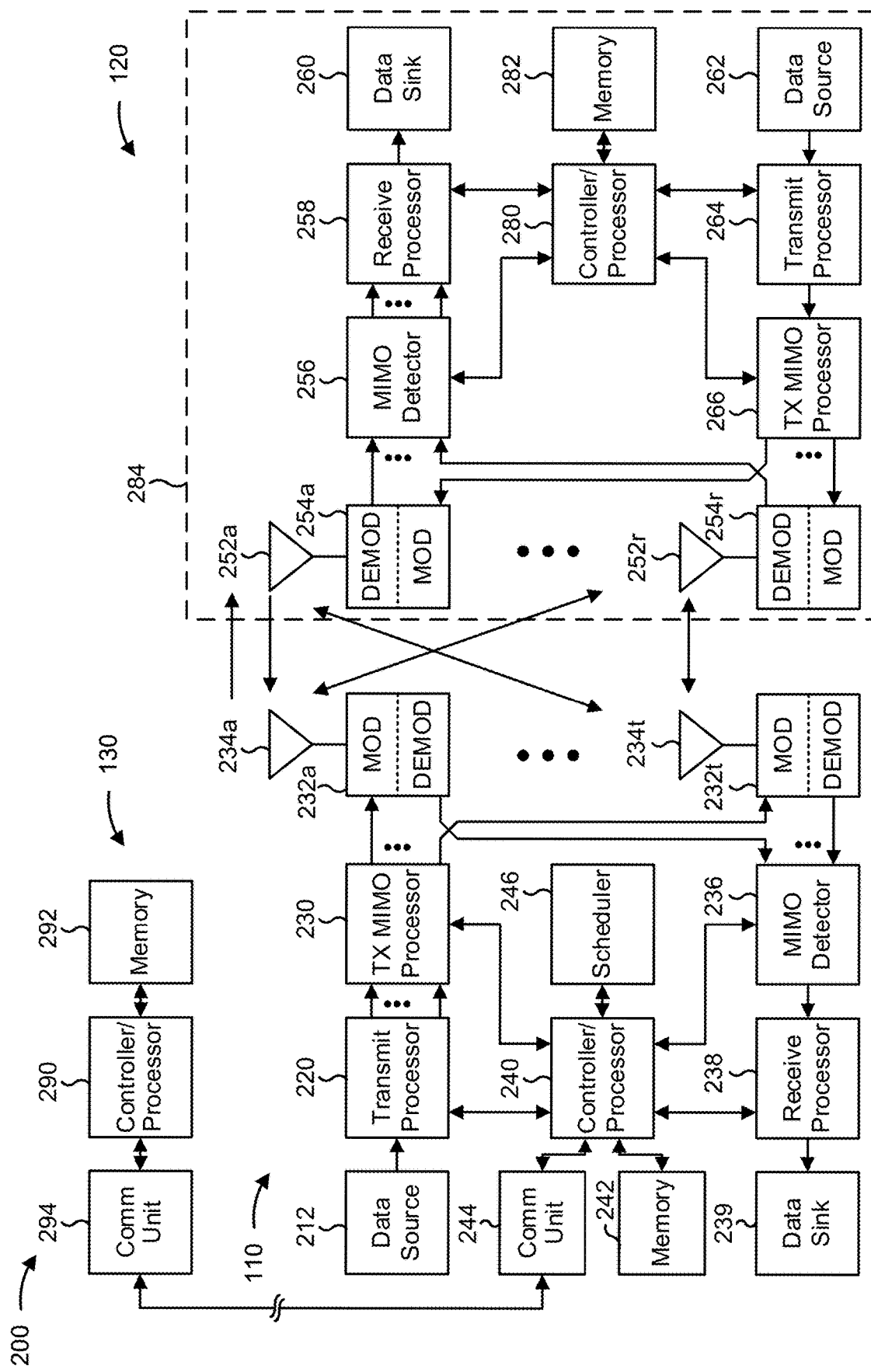
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≧1 and R≧1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-9).

Controller/processor 240 of base station 110, controller/processor 280 of UE 120, and/or any other component(s) of FIG. 2 may perform one or more techniques associated with triggering of an unmanned aerial vehicle (UAV) authentication and authorization procedure, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a UAV UE 120 may include means for performing a registration procedure with a UAV service supplier (USS) device via a network connection to register with the USS device, means for performing a registration procedure with a core network device to register with a network associated with the core network device based at least in part on performing the registration procedure with the USS device, means for receiving, from the core network device, an indication to perform an authentication and authorization procedure only after performing the registration procedure with the USS device and after performing the registration procedure with the core network device, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a network device associated with a UAV flight enablement subsystem (UFES) may include means for receiving, from a USS device, one or more parameters associated with a registration of a UAV UE with the USS device, means for performing an action to cause a core network device to initiate an authentication and authorization procedure with the UAV UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a core network device may include means for receiving, from a network device, one or more parameters associated with registration of a UAV UE with a USS device, means for performing an action to initiate an authentication and authorization procedure with the UAV UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a USS device may include means for performing a registration procedure with a UAV UE to register the UAV UE with the USS device, means for performing an action to cause a core network device to initiate an authentication and authorization procedure with the UAV UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
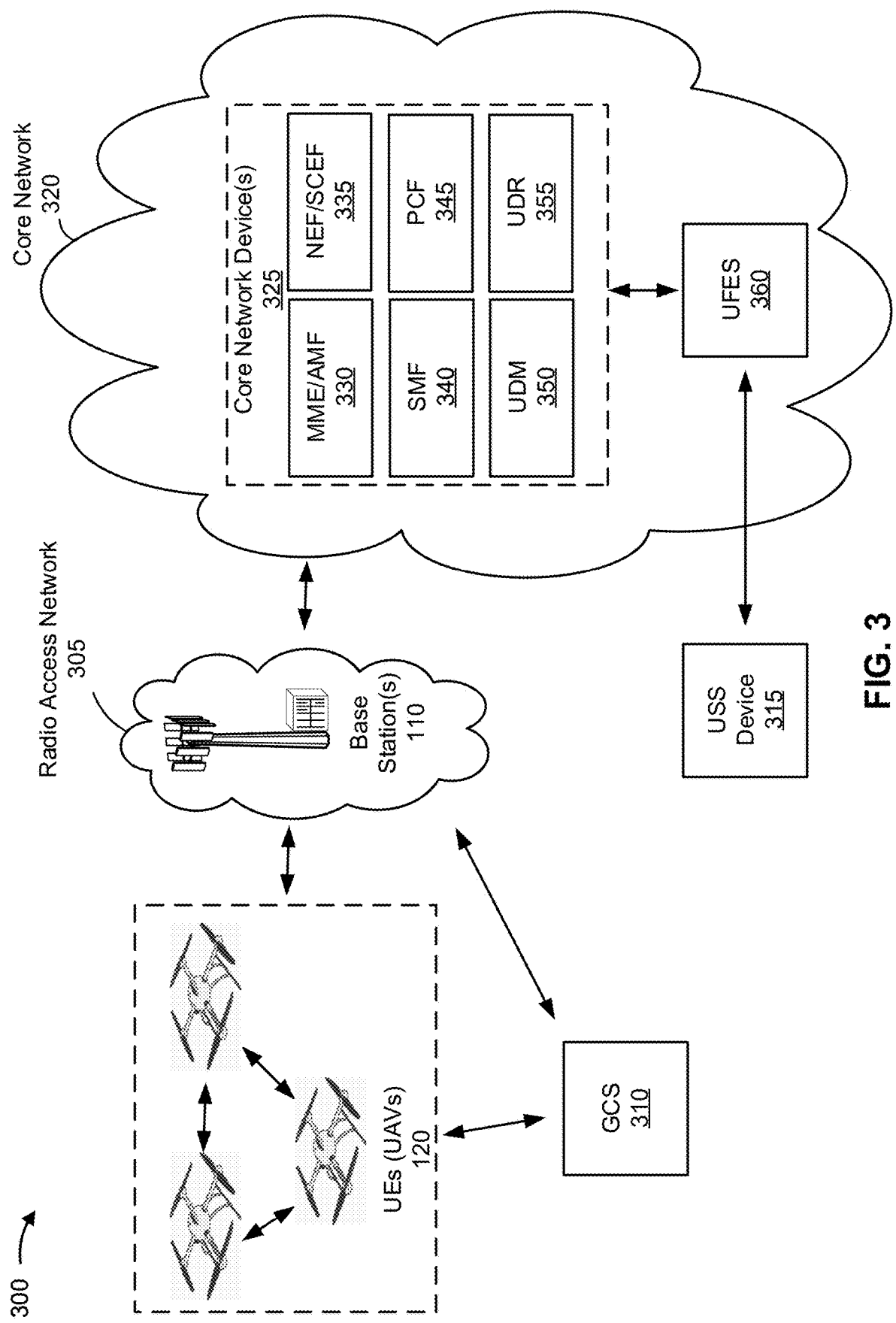
FIG. 3 is a diagram illustrating an example of unmanned aerial vehicles (UAVs) within a wireless communication network environment, in accordance with the present disclosure.

FIG. 3 is a diagram illustrating an example of UAV UEs 120 within a wireless communication network environment 300, in accordance with the present disclosure. As shown in FIG. 3, the environment 300 can include one or more UEs 120, which may include one or more UAV UEs 120, a radio access network (RAN) 305, a core network 320, a UAV USS device 315, and a ground control system (GCS) 310. Devices of environment 300 can interconnect via wired connections, wireless connections, or a combination of wired and wireless connections.

The UAV UE 120 (also referred to herein as a UAV UE 120) includes an aircraft without a human pilot aboard and can also be referred to as an unmanned aircraft (UA), a drone, a remotely piloted vehicle (RPV), a remotely piloted aircraft (RPA), or a remotely operated aircraft (ROA). The UAV UE 120 can have a variety of shapes, sizes, configurations, characteristics, and/or the like for a variety of purposes and applications. In some implementations, the UAV UE 120 can include one or more sensors, such as an electromagnetic spectrum sensor (e.g., a visual spectrum, infrared, or near infrared camera, a radar system, and/or the like), a biological sensor, a temperature sensor, a chemical sensor, and/or the like. In some implementations, the UAV UE 120 can include one or more components for communicating with one or more base stations 110. Additionally, or alternatively, the UAV UE 120 can transmit information to and/or can receive information from the GCS 310, such as sensor data, flight plan information, and/or the like. Such information can be communicated directly (e.g., via a radio resource control (RRC) signal and/or the like) and/or via the base stations 110 on the RAN 305. The UAV UE 120 may be a component of an unmanned aircraft system (UAS). The UAS may include the UAV UE 120, a controller, and a system of communication (such as wireless network 300 or another system of communication) between the UAV UE 120 and the controller.

The RAN 305 includes one or more radio access networks such as, for example, a code division multiple access (CDMA) RAN, a time division multiple access (TDMA) RAN, a frequency division multiple access (FDMA) RAN, a universal terrestrial radio access network (UTRAN), an evolved UTRAN (E-UTRAN) (e.g., a long-term evolution (LTE) RAN, an LTE-Advanced (LTE-A) RAN, an LTE-unlicensed (LTE-U) RAN, and/or the like), and/or the like. The RAN 305 can include one or more base stations 110 that provide access for the UAV UEs 120 to the core network 320.

Base station 110 includes one or more devices capable of transferring traffic, such as audio, video, text, and/or other traffic, destined for and/or received from the UAV UE 120. In some implementations, the base station 110 can include an evolved NodeB (eNB) associated with an LTE RAN that receives traffic from and/or sends traffic to the GCS 310 and/or a USS device 315 via the core network 320. Additionally, or alternatively, one or more base stations 110 can be associated with a RAN that is not associated with the LTE network.

The base station 110 can send traffic to and/or receive traffic from the UAV UE 120 via an air interface. The base stations 110 can include different types of base stations, such as a macro cell base station or a small cell base station (e.g., a micro cell base station, a pico cell base station, and/or a femto cell base station). A macro cell base station can cover a relatively large geographic area (e.g., several kilometers in radius). A small cell base station can be a lower-powered base station, as compared with a macro cell base station, that can operate in the same or different (e.g., licensed, unlicensed, etc.) frequency bands as macro cell base stations.

The GCS 310 includes one or more devices capable of managing the UAV UEs 120 and/or flight plans for the UAV UEs 120. For example, the GCS 310 can include a server device, a desktop computer, a laptop computer, or a similar device. In some implementations, the GCS 310 can communicate with one or more devices of the environment 300 (e.g., the UAV UE 120, the USS device 315, and/or the like) to receive information regarding flight plans for the UAV UEs 120 and/or to provide recommendations associated with such flight plans, as described elsewhere herein. In some implementations, the GCS 310 can permit a user to control the UAV UEs 120. Additionally, or alternatively, the GCS 310 can use a neural network and/or other artificial intelligence (AI) to control the UAV UEs 120. In some implementations, the GCS 310 can be included in a data center, a cloud computing environment, a server farm, and/or the like, which can include multiple GCSs 310. While shown as being external from the core network 320, in some aspects, the GCS 310 can reside at least partially within the core network 320.

The USS device 315 includes one or more devices capable of receiving, storing, processing, and/or providing information associated with the UAV UEs 120 and/or the GCS 310. For example, the USS device 315 can include a desktop computer, a laptop computer, a tablet computer, a mobile phone, or a similar device. In some implementations, the UAV UEs 120 can interact with the USS device 315 to register a flight plan, receive approval, analysis, and/or recommendation related to a flight plan, and/or the like. The USS device 315 may register the UAV UE 120 with the USS device 315 by assigning an application level UAV identifier to the UAV UE 120. The application level UAV identifier may be an aviation administration (e.g., a regulatory body that governs aviation operation in a jurisdiction in which the USS device 315 and the UAV UE 120 are operating) UAV identifier.

The core network 320 includes a network that enables communications between the RAN 305 (e.g., the base stations 110) and one or more devices and/or networks connected to the core network 320. For example, the core network 320 can include an evolved packet core (EPC). The core network 320 can include one or more core network devices 325, such as one or more mobility management entities (MMEs) and/or access and mobility management functions (AMFs) (herein after referred to as a "MME/AMF") 330, one or more network exposure functions (NEFs) and/or service capability exposure function (SCEFs) (herein after referred to as a "NEF/SCEF") 335, one or more session management functions (SMFs) (herein after referred to as an "SMF") 340, one or more policy control functions (PCFs) (herein after referred to as a "PCF") 345, one or more unified data management function (UDMs) (herein after referred to as "UDM") 350, one or more unified data repository functions (UDRs) (herein after referred to as "UDR") 355, and/or other entities and/or functions that provide mobility functions for the UAV UEs 120 and enable the UAV UEs 120 to communicate with other devices of the environment 300.

The MME/AMF 330 includes one or more network devices, such as one or more server devices, capable of managing authentication, activation, deactivation, and/or mobility functions associated with the UAV UE 120 connected to the core network 320. In some implementations, the MME/AMF 330 may perform operations relating to authentication of the UAV UE 120. The MIME/AMF 330 may maintain a non-access stratum (NAS) signaling connection with the UAV UE 120. The MME/AMF 330 may manage a registration procedure of the UAV UE 120 with the radio access network 305 and/or the core network 320. The MME/AMF 330 may perform operations associated with handing off the UAV UE 120 from a first base station 110 to a second base station 110 when the UAV UE 120 is transitioning from a first cell associated with the first base station 110 to a second cell associated with the second base station 110. Additionally, or alternatively, the MIME/AMF 330 may select another MME and/or AMF (not pictured), to which the UAV UE 120 should be handed off (e.g., when the UAV UE 120 moves out of range of the MME/AMF 330).

In some implementations, the MME/AMF 330 may communicate with the UAV UE 120 (e.g., via the base station 110) to obtain information concerning a location of the UAV UE 120 and/or a reachability of the UAV UE 120 and may send the information to the NEF/SCEF 335.

The NEF/SCEF 335 includes one or more network exposure devices, such as one or more server devices, capable of exposing capabilities, events, information, and/or the like in one or more wireless networks to help other devices in the one or more wireless networks discover network services and/or utilize network resources efficiently. In some implementations, the NEF/SCEF 335 may include an NEF associated with a 5G network and/or a SCEF associated with an LTE network that receives traffic from and/or sends traffic to the UAV UE 120 via the MME/AMF 330 and the base station 110, and that receives traffic from and/or sends traffic to the USS device 315. In some implementations, the NEF/SCEF 335 may obtain a data structure, such as approval of a flight plan for the UAV UE 120, from the USS device 315 and divide the data structure into a plurality of data segments. In some implementations, the NEF/SCEF 335 may determine a location and/or reachability of the UAV UE 120 and/or a communication capability of the base station 110 to determine how to send the plurality of data segments to the UAV UE 120.

The SMF 340 includes one or more network devices, such as one or more server devices, capable of managing sessions for the RAN 305 and allocates addresses, such as Internet protocol (IP) addresses, to the UAV UEs 120. In some implementations, the SMF 340 may perform operations relating to registration of the UAV UE 120. For example, the MME/AMF 330 may receive a registration request from the UAV UE 120 and forward a request to the SMF 340 to create a corresponding packet data unit (PDU) session. The SMF 340 may allocate an address to the UAV UE 120 and establish the PDU session for the MME/AMF 330.

The PCF 345 includes one or more network devices, such as one or more server devices, capable of managing traffic to and from the UAV UEs 120 through the RAN 305 and enforcing a quality of service (QoS) on the RAN 305. In some implementations, the PCF 345 may implement charging rules and flow control rules, manage traffic priority, and/or manage a QoS for the UAV UEs 120. In some aspects, as described below in connection with FIG. 4, the PCF 345 may create policy information associated with the UAV UE 120 that includes an application level UAV identifier (assigned by the USS device 315), a network level UAV identifier (assigned by the core network 320), information associated with the USS device, and/or the like. The MME/AMF 330 may use the policy information when performing an authentication and authorization procedure with the UAV UE 120.

The UDM 350 may store subscription information and profiles associated with one or more UAV UEs 120. The UDM 350 can be used for fixed access, mobile access, and/or the like, in the core network 320. For example, the UDM 350 may make relevant data available to one or more other functions of the core network device(s) 325, such as the MME/AMF 330, the SMF 340, and/or the like. The UDR 355 may store structured data for exposure to network functions performed by the core network device(s) 325.

One or more of core network device(s) 325 may correspond to network controller 130, as described above in connection with FIG. 1. The USS device 315 may communicate with core network 320 using one or more interfaces, such as a UFES 360. The UFES 360 may be a service-based interface to enable the USS device to provide information to the core network 320. For example, the USS device 315 may provide, via the UFES 360, registration information associated with a registration between the UAV UE 120 and the USS device. The UFES 360 may be external from the core network 320 or may, at least in part, reside at least partially within the core network 320. In some aspects, the UFES 360 may be co-located with the NEF/SCEF 335.

The UAV UE 120 may be associated with an aerial subscription that is stored and maintained by the core network 320. The aerial subscription may be a subscription for aerial services provided by the core network 320. The core network 320 may assign a network level UAV identifier to an aerial subscription (e.g., using an aviation-level mechanism to ensure global-uniqueness of the network level UAV identifier, such as by including a mobile country code (MCC) and/or a mobile network code (MNC) in the network level UAV identifier). In some aspects, the network level UAV identifier may be a general public subscription identifier (GPSI). The network level UAV identifier of an aerial subscription (e.g., that is associated with the UAV UE 120) may be communicated to the USS device 315 that is associated with the UAV UE 120.

In some aspects, there may be no preexisting association between the USS device 315 and the core network 320 (e.g., the USS device 315 may be chosen dynamically and the UAV UE 120 may be associated with different USS devices 315 over time). As a result, the core network 320 may not include a mapping between the network level UAV identifier and the application level UAV identifier (e.g., assigned by the USS device 315).

In some wireless networks, to provide aerial services to the UAV UE 120, the core network 320 must perform a UAV authentication and authorization procedure. The UAV authentication and authorization procedure may sometimes be referred to as a USS UAV authentication and authorization (UUAA) procedure. The UAV authentication and authorization procedure may be defined and/or required by a regulatory body that governs aviation operation within a jurisdiction in which the UAV UE 120 is operating, such as an aviation authority, an aviation administration, and/or the like. To successfully complete the UAV authentication and authorization procedure, the UAV UE 120 must be registered with both the core network 320 and the USS device 315.

In some cases, the UAV UE 120 may utilize a network connection provided by the core network 320 to communicate with the USS device 315 in order to perform a registration procedure with the USS device 315. In order to establish the network connection, the UAV UE 120 must register with the core network 320. Upon receiving a registration request from a UAV UE 120 and completing the registration, the core network 320 may attempt to perform the UAV authentication and authorization procedure in order to provide aerial services to the UAV UE 120. However, as the UAV UE 120 has not yet registered with the USS device 315, the UAV authentication and authorization procedure may fail. Moreover, as the UAV UE 120 may need to communicate with the USS device 315 using a network connection provided by the core network 320 to register with the USS device 315, the UAV authentication and authorization procedure may continually fail as the UAV UE 120 attempts to establish the network connection to communicate with the USS device 315.

Some techniques and apparatuses described herein enable triggering of the UAV authentication and authorization procedure. For example, the core network devices 325, upon receiving a registration request from the UAV UE 120, may determine if the UAV authentication and authorization procedure is required or already completed. If the UAV authentication and authorization procedure is not required and not already completed, the core network devices 325 may establish a network connection (e.g., a PDU session on a data network name (DNN) of the core network devices 325 that is not dedicated for aerial services) for the UAV UE 120 to communicate with the USS device 315. The UAV UE 120 may utilize the network connection to communicate with the USS device 315 to perform a registration procedure. Upon successfully completing the registration procedure, the USS device 315 may provide information associated with the UAV-USS registration to the UFES 360. The UFES 360 may update the core network device(s) 325 with the UAV-USS registration information.

In some aspects, the UAV authentication and authorization procedure may be triggered by the core network device(s) 325 updating subscription information associated with the UAV UE 120 after receiving the UAV-USS registration information. In some aspects, the UAV authentication and authorization procedure may be triggered by the USS device 315. For example, after performing the registration procedure with the UAV UE 120, the USS device 315 may provide an indication to the core network device(s) 325, via the UFES 360, to perform the UAV authentication and authorization procedure. As a result, the UAV authentication and authorization procedure is not triggered until the UAV UE 120 has completed all required registrations and the core network device(s) 325 have received all required information. This ensures that the UAV authentication and authorization procedure can be properly performed without continuous failures. This improves network performance associated with providing aerial services to the UAV UE 120 as the UAV authentication and authorization procedure is triggered at the appropriate time, enabling the core network 320 to provide aerial services to the UAV UE 120.

As indicated above, FIG. 3 is provided as an example. Other examples may differ from what is described with respect to FIG. 3.

Figure 4:
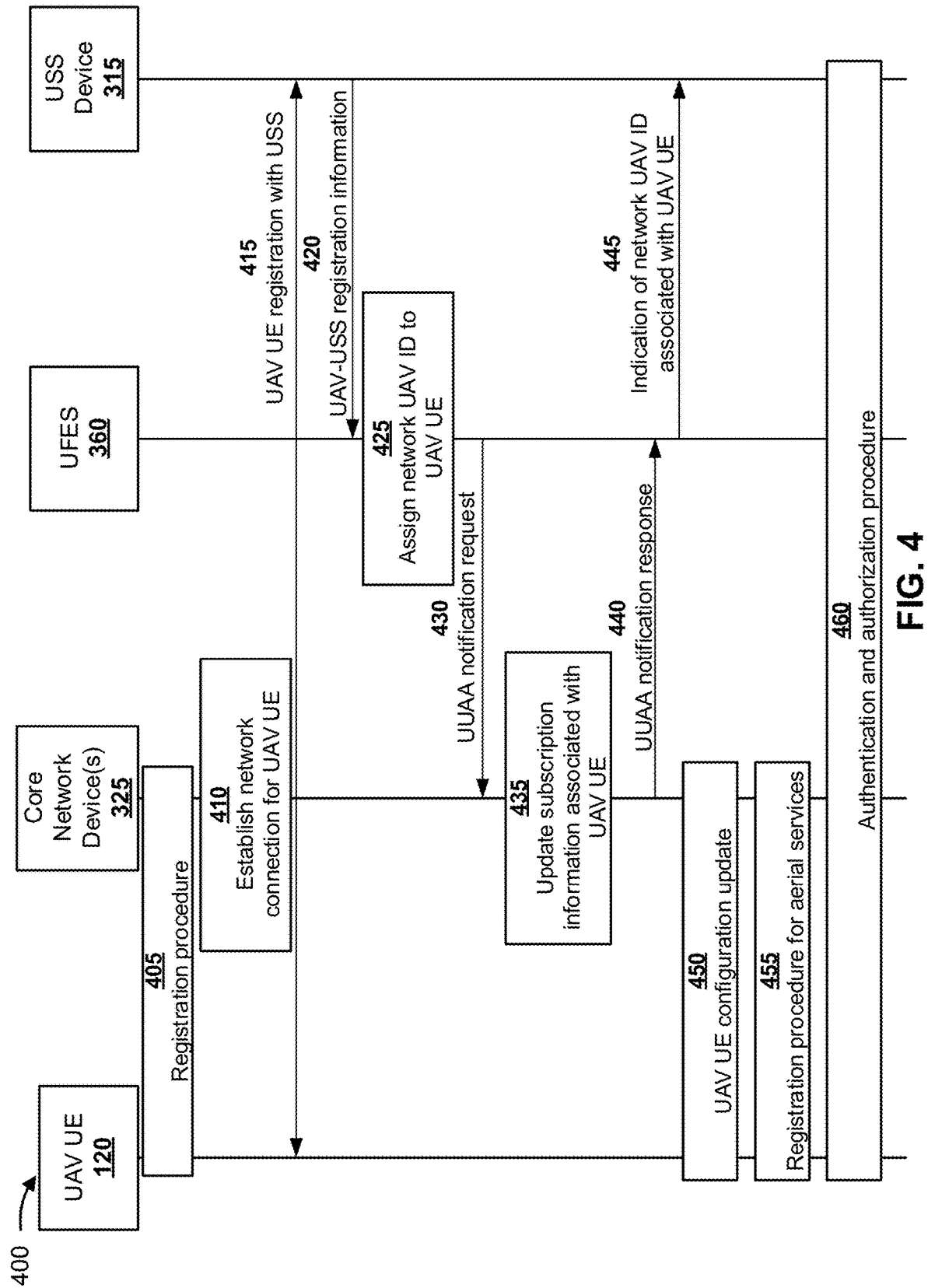
FIGS. 4 and 5 are diagrams illustrating examples associated with triggering of a UAV authentication and authorization procedure, in accordance with the present disclosure.

FIG. 4 is a diagram illustrating an example 400 associated with triggering of a UAV authentication and authorization procedure, in accordance with the present disclosure. As shown in FIG. 4, a UAV UE 120 may communicate with one or more devices in wireless communication network environment, such as wireless communication network environment 300. The UAV UE 120 may communicate using a wireless network (e.g., a 5G network, an LTE network, and/or the like), such as wireless network 100, radio access network 305, core network 320, and/or the like. As shown in FIG. 4, the wireless communication network environment may include the one or more core network device(s) 325, the UFES 360, and the USS device 315.

As described above in connection with FIG. 3, the core network device(s) 325 may include the MME/AMF 330, the NEF/SCEF 335, the SMF 340, the PCF 345, the UDM 350, the UDR 355, and/or the like. The UAV UE 120 may communicate with the core network device(s) 325 using NAS signaling and/or the like. The USS device 315 may communicate with the core network device(s) 325 using the UFES 360. The UFES 360 may be a network device associated with and/or included within the core network, or a network device may include the UFES 360.

As shown by reference number 405, the UAV UE 120 and the core network device(s) 325 may perform a registration procedure. The registration procedure may be an initial registration procedure (e.g., a registration procedure performed before aerial services have been provided to the UAV UE 120, before the UAV UE 120 registers with the USS device 315, and/or the like). The registration procedure may include the UAV UE 120 transmitting, to the core network device(s) 325 (e.g., to the MME/AMF 330) a registration request. In some aspects, the registration request may indicate that the UAV UE 120 is registering for aerial services provided by the core network. In some aspects, the registration request may not include an indication that the UAV UE 120 is registering for aerial services provided by the core network. For example, the registration request from the UAV UE 120 may indicate that the UAV UE 120 is registering with the core network device(s) 325 to establish a network connection to communicate with the USS device 315 (e.g., and not for aerial services).

The registration procedure may include the core network devices(s) 325 determining whether a UAV authentication and authorization procedure is required. For example, the core network devices(s) 325 may obtain subscription information associated with the UAV UE 120 to determine if the subscription information indicates that the UAV authentication and authorization procedure is required (e.g., the MME/AMF 330 may obtain the subscription information from the UDM 350 and/or the UDR 355). The core network device(s) 325 may identify the subscription information based at least in part on a subscription permanent identifier (SUPI) associated with the UAV UE 120. If the subscription information indicates that the UAV authentication and authorization procedure is not required, the core network device(s) 325 may determine whether the UAV UE 120 is authorized for aerial services. If the subscription information indicates that the UAV authentication and authorization procedure has not already been completed and/or the subscription information indicates that UAV-USS registration information has not been provided to the core network device(s) 325, the core network device(s) 325 (e.g., the MME/AMF 330) may determine that the UAV UE 120 is not authorized for aerial services provided by the core network.

As shown by reference number 410, the core network device(s) 325 may establish a network connection for the UAV UE 120. For example, if the UAV UE 120 is not authorized for aerial services provided by the core network, the core network device(s) 325 (e.g., the MME/AMF 330) registers the UAV UE 120 as a normal wireless device (e.g., a normal UE 120 that is not authorized for aerial services). The core network device(s) 325 may establish, with the UAV UE 120, a PDU session. The core network device(s) 325 may establish the PDU session to any DNN that is not dedicated for aerial services. The UAV UE 120 may use the PDU session to communicate with other devices (e.g., the USS device 315) within the network.

As shown by reference number 415, the UAV UE 120 and the USS device 315 may perform a registration procedure. The UAV UE 120 and the USS device 315 may communicate using the network connection (e.g., the PDU session) to perform the registration procedure. In some aspects, the UAV UE 120 and the USS device 315 may communicate using another communication connection (e.g., not provided by the network) to perform the registration procedure.

As part of the registration procedure with the USS device 315, the UAV UE 120 may provide an identifier associated with the network to the USS device 315. For example, the UAV UE 120 may transmit an indication of a public land mobile network (PLMN) identifier associated with the network. The USS device 315 may assign an application level UAV identifier to the UAV UE 120 during the registration procedure.

As shown by reference number 420, the USS device 315 may transmit, and the UFES 360 may receive, UAV-USS registration information associated with the registration procedure between the UAV UE 120 and the USS device 315. The USS device 315 may identify the UFES 360 based at least in part on the PLMN identifier indicated by the UAV UE 120. For example, the USS device 315 may determine an address of the UFES 360 based at least in part on the PLMN identifier. In some aspects, the USS device 315 may utilize the IP address used by the UAV UE 120 when performing the registration procedure with the USS device 315 to identify the UFES 360.

The USS device 315 may transmit, to the UFES 360, an indication that the registration procedure with the UAV UE 120 was successfully completed. The USS device 315 may transmit one or more parameters associated with the UAV-USS registration information. The one or more parameters may include the IP address associated with the UAV UE 120, information associated with the USS device 315 (e.g., an IP address and/or the like), the application level UAV identifier associated with the UAV UE 120, the PLMN identifier associated with the network, and/or the like. In some aspects, the indication that the registration procedure with the UAV UE 120 was successfully completed may indicate that the UAV UE 120 is provisioned for aerial operations.

As shown by reference number 425, the UFES 360 may assign a network level UAV identifier to the UAV UE 120. For example, the UFES 360 may identify the SUPI associated with the UAV UE 120 (e.g., based at least in part on the IP address associated with the UAV UE 120). The UFES 360 may determine if a network level UAV identifier has been previously assigned to the UAV UE 120 (e.g., by obtaining subscription information associated with the UAV UE 120 from the UDM 350). The UFES 360 may determine the network level UAV identifier associated with the UAV UE 120 from the subscription information. If the UFES 360 determines that a network level UAV identifier has not been previously assigned to the UAV UE 120, the UFES 360 may assign a network level UAV identifier to the UAV UE 120.

As shown by reference number 430, the UFES 360 may transmit, to the core network device(s) 325, an authentication and authorization procedure (e.g., a USS UAV authentication and authorization (UUAA) procedure) notification request for the UAV UE 120. For example, the UFES 360 may transmit the authorization request to the PCF 345. The UUAA notification request may indicate one or more subscription parameters associated with the UAV UE 120. The one or more subscription parameters may include the IP address associated with the UAV UE 120, the information associated with the USS device 315, the SUPI associated with the UAV UE 120, the application level UAV identifier associated with the UAV UE 120, the network level UAV identifier associated with the UAV UE 120, and/or the like.

As shown by reference number 435, the core network device(s) 325 may update subscription information associated with the UAV UE 120. For example, the PCF 345 may receive the UUAA notification request from the UFES 360. The PCF 345 may obtain the subscription information associated with the UAV UE 120 (e.g., from the UDR 355). The PCF 345 may determine if the subscription information includes any of the same information as information indicated in the UUAA notification request. The PCF 345 may update and/or add information to the subscription information. For example, the PCF 345 may update and/or add the application level UAV identifier associated with the UAV UE 120, the network level UAV identifier associated with the UAV UE 120, the information associated with the USS device 315, and/or the like in the subscription information.

As shown by reference number 440, the core network device(s) 325 may transmit, to the UFES 360, an UUAA notification response. The UUAA notification response may indicate that information associated with the UAV UE 120 was successfully created and/or authorized (e.g., indicating that the PCF 345 successfully updated and/or added information within the subscription information associated with the UAV UE 120). The UFES 360 may store a mapping between the application level UAV identifier associated with the UAV UE 120 and the network level UAV identifier associated with the UAV UE 120 based at least in part on receiving the UUAA notification response. As shown by reference number 445, the UFES 360 may transmit, to the USS device 315, an indication of the network level UAV identifier associated with the UAV UE 120.

As shown by reference number 450, the core network device(s) 325 may perform a configuration update with the UAV UE 120. For example, after updating the subscription information associated with the UAV UE 120 to include information that was indicated in the UUAA notification request, the core network device(s) 325 may update the subscription information (e.g., within the UDR 355) to include an indication that the UAV authorization and authentication procedure is to be performed. The indication that the UAV authorization and authentication procedure is to be performed may indicate that the UAV authorization and authentication procedure is required, that UAV-USS registration information has been provided, and/or the like. The UDR 355 may provide an indication to the UDM 350 that the subscription information associated with the UAV UE 120 has been updated. The UDM 350 may provide an indication to the MME/AMF 330 that the subscription information associated with the UAV UE 120 has been updated. The MME/AMF 330 may determine that the subscription information associated with the UAV UE 120 has been updated to include an indication that the UAV authorization and authentication procedure is to be performed. As a result, the MME/AMF 330 may perform the configuration update with the UAV UE 120.

The configuration update with the UAV UE 120 may include the core network device(s) 325 (e.g., the MME/AMF 330) providing the UAV UE 120 with an indication of a permissible mobility area for the UAV UE 120. The permissible mobility area may include a registration area (e.g., an area in which the UAV UE 120 can travel and receive aerial services from the network) and/or one or more forbidden areas (e.g., areas in which the UAV UE 120 cannot receive aerial services from the network). The configuration update with the UAV UE 120 may include the core network device(s) 325 (e.g., the MME/AMF 330) providing the UAV UE 120 with a request to register (e.g., re-register) with the core network device(s) for aerial services.

As shown by reference number 455, the UAV UE 120 and the core network device(s) 325 (e.g., the MME/AMF 330) may perform a registration procedure for aerial services provided by the network. The UAV UE 120 and the core network device(s) 325 (e.g., the MME/AMF 330) may perform a registration procedure based at least in part on the configuration update performed by the core network device(s) 325. In some aspects, the UAV UE 120 may transmit, to the core network device(s) 325, a registration request that indicates that the UAV UE 120 is registering for aerial services. The UAV UE 120 may transmit the registration request in a NAS message. The core network device(s) 325 (e.g., the MME/AMF 330) may register the UAV UE 120 for aerial services provided by the network.

As shown by reference number 460, the core network device(s) 325 (e.g., the MME/AMF 330) may initiate the UAV authentication and authorization procedure after registering the UAV UE 120 for aerial services provided by the network. For example, the UAV authentication and authorization procedure may be initiated only after the UAV UE 120 performs the registration procedure with the USS device 315 and after the UAV UE 120 performs the registration procedure with the core network device(s) 325. The UAV UE 120, the core network device(s) 325, the UFES 360, and/or the USS device 315 may perform and/or participate in the UAV authentication and authorization procedure. After successful completion of the UAV authentication and authorization procedure, the UAV UE 120 may be enabled to receive aerial services from the network.

After the UAV authentication and authorization procedure is successfully performed, the core network device(s) 325 may update the subscription information associated with the UAV UE 120 to indicate that the UAV authentication and authorization procedure has been completed. In this way, if the MME/AMF 330 selects a different MME and/or AMF (not pictured), to handoff the UAV UE 120 to (e.g., when the UAV UE 120 moves out of range of the MME/AMF 330), the different MME and/or AMF may determine that the UAV authentication and authorization procedure has already been completed. This conserves resources that would have otherwise been used by the different MME and/or AMF attempting to perform the UAV authentication and authorization procedure again.

In this way, the UAV authentication and authorization procedure may be triggered after the USS device 315 provides information associated with the UAV-USS registration to the UFES 360. As a result, the UFES 360 causes the core network device(s) 325 to update subscription information associated with the UAV UE 120 to indicate that the UAV authentication and authorization procedure is to be performed. This causes the core network device(s) 325 (e.g., the MME/AMF 330) to trigger the UAV authentication and authorization procedure. As a result, the UAV authentication and authorization procedure is not triggered until the UAV UE 120 has completed all required registrations and the core network device(s) 325 have received all required information. This ensures that the UAV authentication and authorization procedure can be properly performed without continuous failures. This improves network performance associated with providing aerial services to the UAV UE 120 as the UAV authentication and authorization procedure is triggered at the appropriate time, enabling the network to provide aerial services to the UAV UE 120.

As indicated above, FIG. 4 is provided as an example. Other examples may differ from what is described with respect to FIG. 4.

Figure 5:
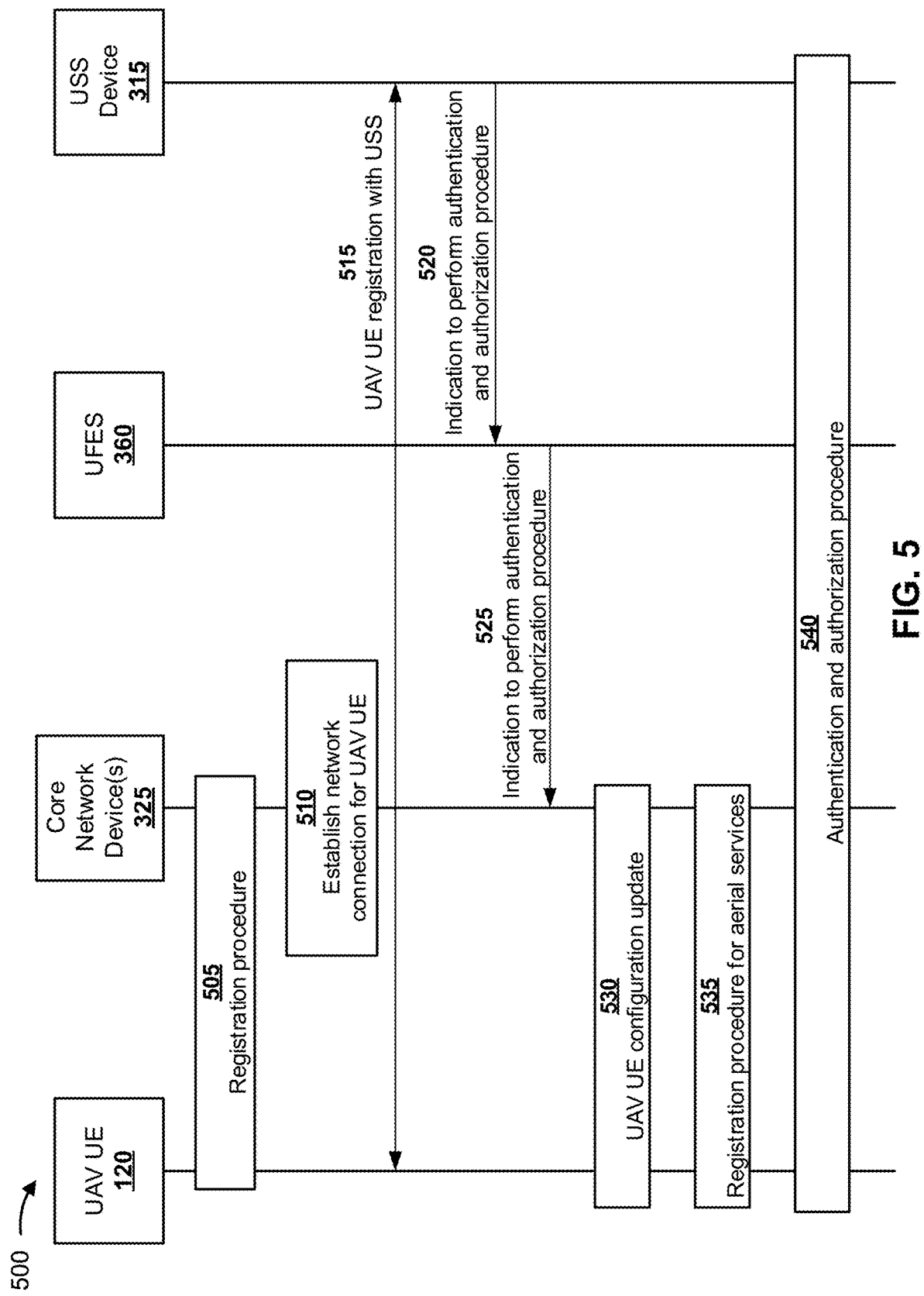

FIG. 5 is a diagram illustrating an example 500 associated with triggering of a UAV authentication and authorization procedure, in accordance with the present disclosure. As shown in FIG. 5, a UAV UE 120 may communicate with one or more devices in wireless communication network environment, such as wireless communication network environment 300. The UAV UE 120 may communicate using a wireless network (e.g., a 5G network, an LTE network, and/or the like), such as wireless network 100, radio access network 305, core network 320, and/or the like. As shown in FIG. 4, the wireless communication network environment may include the one or more core network device(s) 325, the UFES 360, and the USS device 315.

As described above in connection with FIG. 3, the core network device(s) 325 may include the MME/AMF 330, the NEF/SCEF 335, the SMF 340, the PCF 345, the UDM 350, the UDR 355, and/or the like. The UAV UE 120 may communication with the core network device(s) 325 using NAS signaling and/or the like. The USS device 315 may communicate with the core network device(s) 325 using the UFES 360. The UFES 360 may be a network device associated with and/or included within the core network, or a network device may include the UFES 360.

As shown by reference number 505, the UAV UE 120 and the core network device(s) 325 may perform a registration procedure. The registration procedure may be performed in a similar (or the same) manner as described above with respect to reference number 405 and FIG. 4. As shown by reference number 510, the core network device(s) 325 may establish a network connection for the UAV UE 120 (e.g., a PDU session and/or the like). The core network device(s) 325 may establish the network connection for the UAV UE 120 in a similar (or the same) manner as described above with respect to reference number 410 and FIG. 4.

As shown by reference number 515, the UAV UE 120 and the USS device 315 may perform a registration procedure. The UAV UE 120 and the USS device 315 may communicate using the network connection (e.g., the PDU session) to perform the registration procedure. In some aspects, the UAV UE 120 and the USS device 315 may communicate using another communication connection (e.g., not provided by the network) to perform the registration procedure. The UAV UE 120 and the USS device 315 may perform the registration procedure in a similar (or the same) manner as described above with respect to reference number 415 and FIG. 4.

As shown by reference number 520, the USS device 315 may transmit, to the UFES 360, an indication (or a request) to perform the UAV authentication and authorization procedure with the UAV UE 120. In some aspects, the USS device 315 may transmit the indication to perform the UAV authentication and authorization procedure with the UAV UE 120 after providing UAV-USS registration information to the UFES 360 (e.g., as described above with respect to reference number 420 of FIG. 4). For example, the USS device 315 may transmit the indication to perform the UAV authentication and authorization procedure with the UAV UE 120 after transmitting the UAV-USS registration information to the UFES 360, after receiving an indication of the network level UAV identifier associated with the UE 120 (e.g., as described above with respect to reference number 445 of FIG. 4), or at a later time. In some aspects, the USS device 315 may transmit the indication to perform the UAV authentication and authorization procedure with the UAV UE 120 with the transmission indicating the UAV-USS registration information to the UFES 360 (e.g., as described above with respect to reference number 420 of FIG. 4).

In some aspects, the indication to perform the UAV authentication and authorization procedure with the UAV UE 120 may indicate the IP address associated with the UAV UE 120, information associated with the USS device 315, the application level UAV identifier associated with the UAV UE 120, the PLMN identifier associated with a network, and/or the like. In some aspects, the indication to perform the UAV authentication and authorization procedure with the UAV UE 120 may only include a request for the core network device(s) 325 to perform the UAV authentication and authorization procedure with the UAV UE 120.

As shown by reference number 525, the UFES 360 may transmit, to the core network device(s) 325, an indication to perform the UAV authentication and authorization procedure with the UAV UE 120. The UFES 360 may transmit the indication to perform the UAV authentication and authorization procedure with the UAV UE 120 based at least in part on receiving the indication to perform the UAV authentication and authorization procedure with the UAV UE 120 from the USS device 315. The UFES 360 may transmit the indication to perform the UAV authentication and authorization procedure with the UAV UE 120 to the MME/AMF 330.

The indication to perform the UAV authentication and authorization procedure with the UAV UE 120 transmitted by the UFES 360 may indicate information required by the core network device(s) to perform the UAV authentication and authorization procedure. For example, the indication to perform the UAV authentication and authorization procedure with the UAV UE 120 transmitted by the UFES 360 may indicate the information associated with the USS device 315, the application level UAV identifier associated with the UAV UE 120, the network level UAV identifier associated with the UAV UE 120, and/or the like.

As shown by reference number 530, the core network device(s) 325 may perform a configuration update with the UAV UE 120. For example, the MME/AMF 330 may perform the configuration update with the UAV UE 120. The core network device(s) 325 may perform the configuration update with the UAV UE 120 based at least in part on receiving the indication to perform the UAV authentication and authorization procedure with the UAV UE 120 from the UFES 360.

The configuration update with the UAV UE 120 may include the core network device(s) 325 (e.g., the MME/AMF 330) providing the UAV UE 120 with an indication of a permissible mobility area for the UAV UE 120. The permissible mobility area may include a registration area (e.g., an area in which the UAV UE 120 can travel and receive aerial services from the network) and/or one or more forbidden areas (e.g., areas in which the UAV UE 120 cannot receive aerial services from the network). The configuration update with the UAV UE 120 may include the core network device(s) 325 (e.g., the MME/AMF 330) providing the UAV UE 120 with a request to register (e.g., re-register) with the core network device(s) for aerial services.

As shown by reference number 535, the UAV UE 120 and the core network device(s) 325 (e.g., the MME/AMF 330) may perform a registration procedure for aerial services provided by the network. The UAV UE 120 and the core network device(s) 325 (e.g., the MME/AMF 330) may perform a registration procedure based at least in part on the configuration update performed by the core network device(s) 325. In some aspects, the UAV UE 120 may transmit, to the core network device(s) 325, a registration request that indicates that the UAV UE 120 is registering for aerial services. The UAV UE 120 may transmit the registration request in a NAS message. The core network device(s) 325 (e.g., the MME/AMF 330) may register the UAV UE 120 for aerial services provided by the network.

As shown by reference number 540, the core network device(s) 325 (e.g., the MME/AMF 330) may initiate the UAV authentication and authorization procedure after registering the UAV UE 120 for aerial services provided by the network. The UAV UE 120, the core network device(s) 325, the UFES 360, and/or the USS device 315 may perform and/or participate in the UAV authentication and authorization procedure. After successful completion of the UAV authentication and authorization procedure, the UAV UE 120 may be enabled to receive aerial services from the network.

After the UAV authentication and authorization procedure is successfully performed, the core network device(s) 325 may update the subscription information associated with the UAV UE 120 to indicate that the UAV authentication and authorization procedure has been completed. In this way, if the MME/AMF 330 selects a different MME and/or AMF (not pictured), to handoff the UAV UE 120 to (e.g., when the UAV UE 120 moves out of range of the MME/AMF 330), the different MME and/or AMF may determine that the UAV authentication and authorization procedure has already been completed. This conserves resources that would have otherwise been used by the different MME and/or AMF attempting to perform the UAV authentication and authorization procedure again.

In this way, the UAV authentication and authorization procedure may be triggered by the USS device 315 after the UAV UE 120 registers with the UE 120 and after the USS device 315 provides UAV-USS registration information to the network. For example, the USS device 315 may indicate to the UFES 360 that the UAV authorization and authentication procedure is to be performed. As a result, the UFES 360 causes the core network device(s) 325 (e.g., the MME/AMF 330) to initiate the UAV authentication and authorization procedure. As a result, the UAV authentication and authorization procedure is not triggered until the UAV UE 120 has completed all required registrations and the core network device(s) 325 have received all required information. This ensures that the UAV authentication and authorization procedure can be properly performed without continuous failures. This improves network performance associated with providing aerial services to the UAV UE 120 as the UAV authentication and authorization procedure is triggered at the appropriate time, enabling the network to provide aerial services to the UAV UE 120.

As indicated above, FIG. 5 is provided as an example. Other examples may differ from what is described with respect to FIG. 5.

Figure 6:
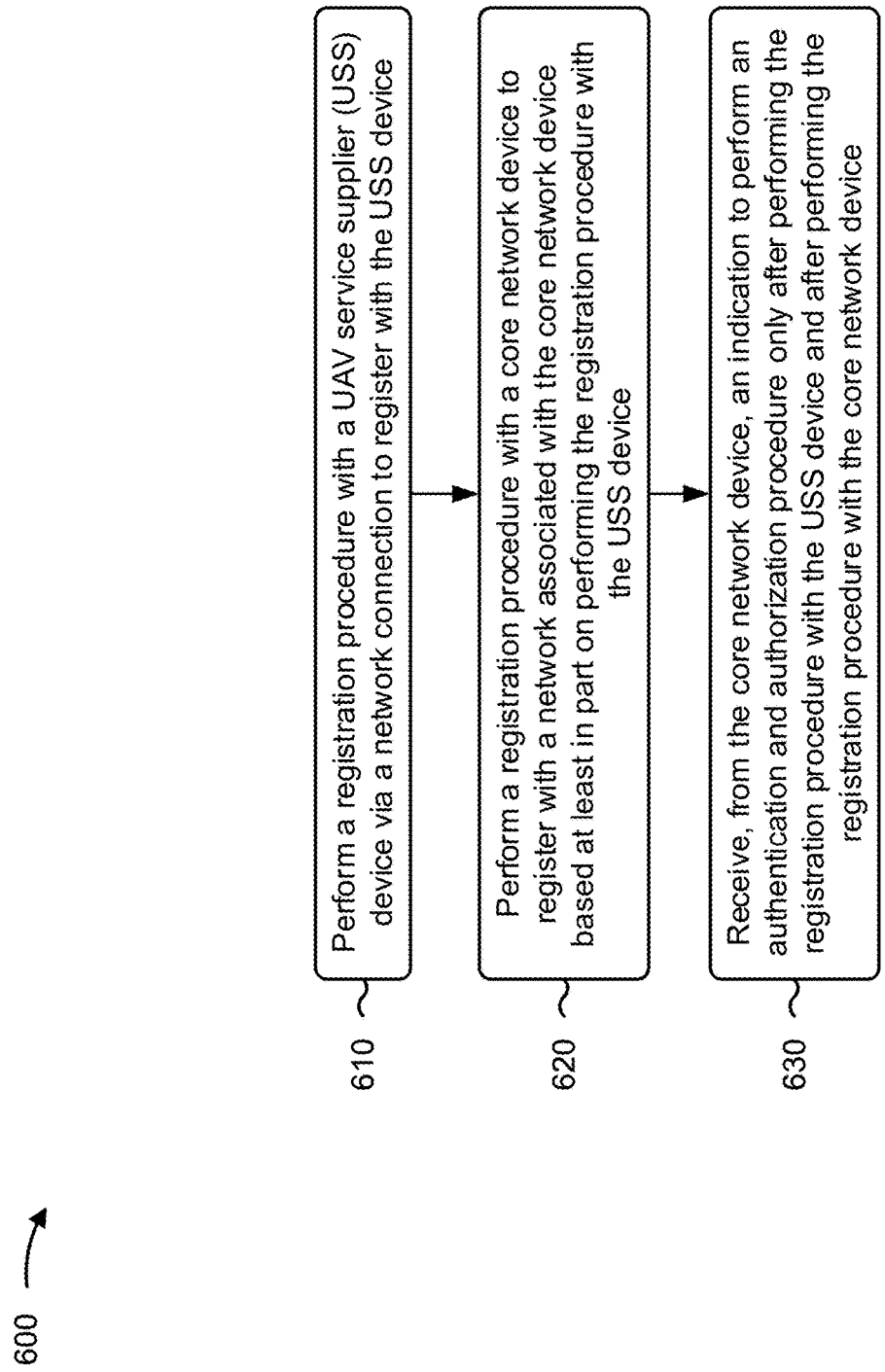
FIGS. 6-9 are diagrams illustrating example processes associated with triggering of a UAV authentication and authorization procedure, in accordance with the present disclosure.

FIG. 6 is a diagram illustrating an example process 600 performed, for example, by a UAV UE, in accordance with the present disclosure. Example process 600 is an example where the UAV UE (e.g., UAV UE 120) performs operations associated with triggering of a UAV authentication and authorization procedure.

As shown in FIG. 6, in some aspects, process 600 may include performing a registration procedure with a USS device via a network connection to register with the USS device (block 610). For example, the UAV UE (e.g., using antenna 252, demodulator 254, MIMO detector 256, receive processor 258, transmit processor 264, TX MIMO processor 266, modulator 254, controller/processor 280, and/or memory 282) may perform a registration procedure with a USS device via a network connection to register with the USS device, as described above.

As further shown in FIG. 6, in some aspects, process 600 may include performing a registration procedure with a core network device to register with a network associated with the core network device based at least in part on performing the registration procedure with the USS device (block 620). For example, the UAV UE (e.g., using antenna 252, demodulator 254, MIMO detector 256, receive processor 258, transmit processor 264, TX MIMO processor 266, modulator 254, controller/processor 280, and/or memory 282) may perform a registration procedure with a core network device to register with a network associated with the core network device based at least in part on performing the registration procedure with the USS device, as described above.

As further shown in FIG. 6, in some aspects, process 600 may include receiving, from the core network device, an indication to perform an authentication and authorization procedure only after performing the registration procedure with the USS device and after performing the registration procedure with the core network device (block 630). For example, the UAV UE (e.g., using antenna 252, demodulator 254, MIMO detector 256, receive processor 258, controller/processor 280, and/or memory 282) may receive, from the core network device, an indication to perform an authentication and authorization procedure only after performing the registration procedure with the USS device and after performing the registration procedure with the core network device, as described above.

Process 600 may include additional aspects, such as any single aspect or any combination of aspects described below and/or in connection with one or more other processes described elsewhere herein.

In a first aspect, process 600 includes performing an initial registration procedure with the core network device to establish the network connection.

In a second aspect, alone or in combination with the first aspect, performing the initial registration procedure with the core network device to establish the network connection comprises transmitting, to the core network device, a registration request that includes an indication of whether the UAV UE is registering for aerial services provided by the network, and establishing a PDU session associated with the network.

In a third aspect, alone or in combination with one or more of the first and second aspects, performing the registration procedure with the USS device comprises transmitting, to the USS device via the network connection, an indication of a PLMN identifier associated with the network.

In a fourth aspect, alone or in combination with one or more of the first through third aspects, performing the registration procedure with the USS device comprises receiving, from the USS device, an application level UAV identifier associated with the UAV UE.

In a fifth aspect, alone or in combination with one or more of the first through fourth aspects, performing the registration procedure with the core network device to register with the network associated with the core network device comprises performing the registration procedure with an AMF of the network.

In a sixth aspect, alone or in combination with one or more of the first through fifth aspects, performing the registration procedure with the core network device to register with the network associated with the core network device comprises receiving, from the core network device, a request to initiate a registration procedure to register the UAV UE as a UAV with the network, wherein the request to initiate the registration procedure is based at least in part on performing the registration procedure with the USS device.

In a seventh aspect, alone or in combination with one or more of the first through sixth aspects, receiving, from the core network device, the request to initiate the registration procedure to register the UAV UE as a UAV with the network comprises receiving the request to initiate the registration procedure from an AMF of the network.

In an eighth aspect, alone or in combination with one or more of the first through seventh aspects, performing the registration procedure with the core network device to register with the network associated with the core network device comprises receiving an indication of a network level UAV identifier associated with the UAV ID associated with aerial services provided by the network.

In a ninth aspect, alone or in combination with one or more of the first through eighth aspects, the network level UAV identifier is a general public subscription identifier.

In a tenth aspect, alone or in combination with one or more of the first through ninth aspects, performing the registration procedure with the core network device to register with the network associated with the core network device comprises receiving an indication of a permissible mobility area for the UAV UE.

In an eleventh aspect, alone or in combination with one or more of the first through tenth aspects, performing the registration procedure with the core network device to register with the network associated with the core network device comprises transmitting a request to register with the network, wherein the request includes an indication that the UAV UE is registering for aerial services provided by the network.

In a twelfth aspect, alone or in combination with one or more of the first through eleventh aspects, the indication that the UAV UE is registering for aerial services is included in an NAS message.

In a thirteenth aspect, alone or in combination with one or more of the first through twelfth aspects, process 600 includes transmitting a communication to cause an AMF of the network to perform the authentication and authorization procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
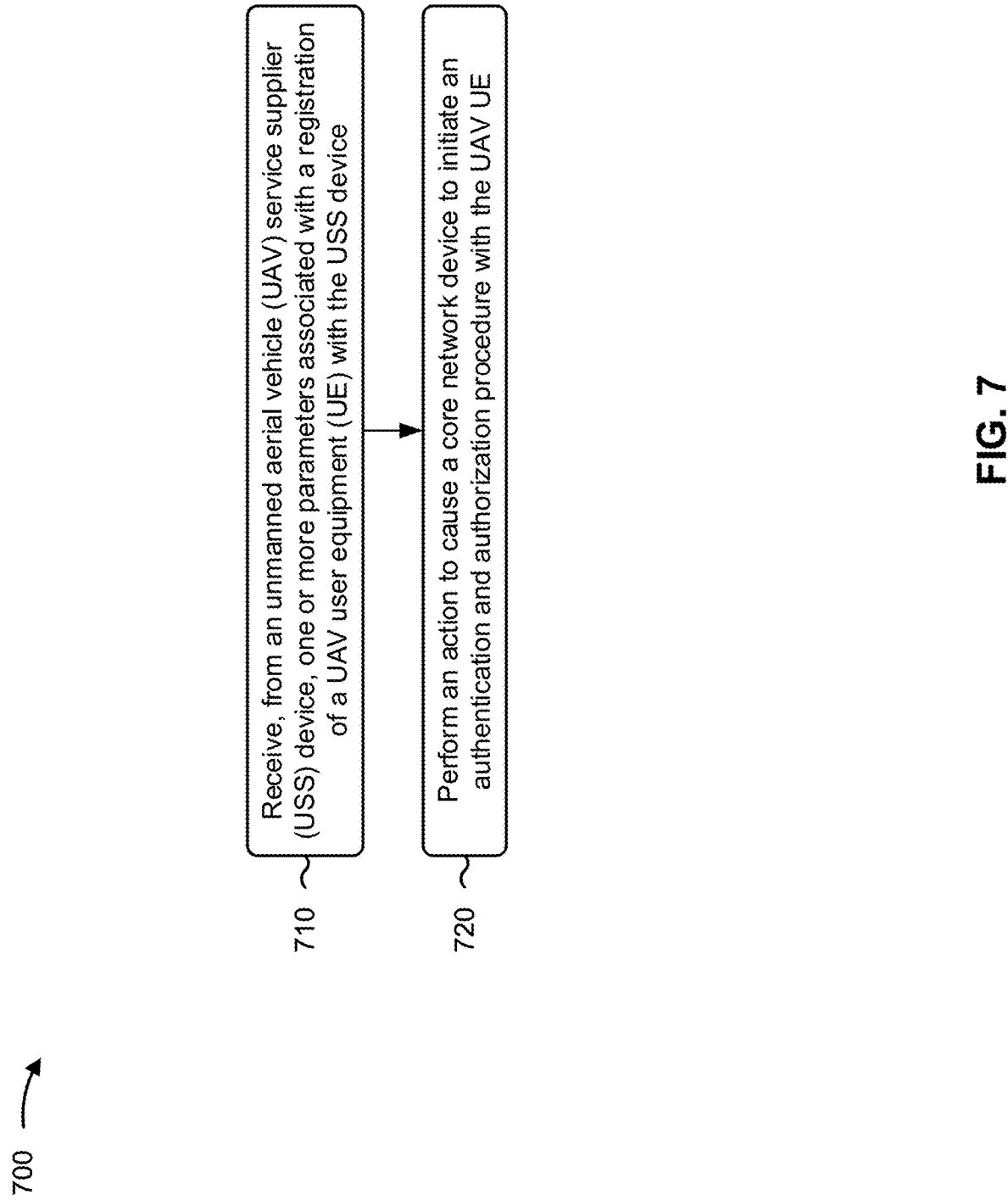

FIG. 7 is a diagram illustrating an example process 700 performed, for example, by a network device, in accordance with the present disclosure. Example process 700 is an example where the network device (e.g., a network device associated with the UFES 360) performs operations associated with triggering of a UAV authentication and authorization procedure.

As shown in FIG. 7, in some aspects, process 700 may include receiving, from a USS device, one or more parameters associated with a registration of a UAV UE with the USS device (block 710). For example, the network device (e.g., using antenna 234, demodulator 232, MIMO detector 236, receive processor 238, controller/processor 240, and/or memory 242) may receive, from an USS device, one or more parameters associated with a registration of a UAV UE with the USS device, as described above.

As further shown in FIG. 7, in some aspects, process 700 may include performing an action to cause a core network device to initiate an authentication and authorization procedure with the UAV UE (block 720). For example, the network device (e.g., using transmit processor 220, TX MIMO processor 230, modulator 232, antenna 234, demodulator 232, MIMO detector 236, receive processor 238, controller/processor 240, memory 242, and/or scheduler 246) may perform an action to cause a core network device to initiate an authentication and authorization procedure with the UAV UE, as described above.

Process 700 may include additional aspects, such as any single aspect or any combination of aspects described below and/or in connection with one or more other processes described elsewhere herein.

In a first aspect, the one or more parameters associated with the registration of the UAV UE with the USS device include at least one of an IP address associated with the UAV UE, information associated with the USS device, an application level UAV identifier associated with the UAV UE, or a PLMN identifier associated with a network associated with the network device.

In a second aspect, alone or in combination with the first aspect, process 700 includes determining a SUPI associated with the UAV UE based at least in part on the one or more parameters associated with the registration of the UAV UE with the USS device.

In a third aspect, alone or in combination with one or more of the first and second aspects, process 700 includes determining whether the UAV UE is associated with a network level UAV identifier based at least in part on a SUPI associated with the UAV UE.

In a fourth aspect, alone or in combination with one or more of the first through third aspects, process 700 includes assigning a network level UAV identifier to the UAV UE based at least in part on determining that the UAV UE is not associated with a network level UAV identifier.

In a fifth aspect, alone or in combination with one or more of the first through fourth aspects, process 700 includes obtaining the network level UAV identifier associated with the UAV UE from a UDM component of the core network device based at least in part on determining that the UAV UE is associated with a network level UAV identifier.

In a sixth aspect, alone or in combination with one or more of the first through fifth aspects, performing the action to cause the core network device to initiate the authentication and authorization procedure with the UAV UE comprises transmitting, to the core network device, an indication of one or more subscription parameters associated with the UAV UE, to cause the core network device to update subscription information associated with the UAV UE to indicate that the authentication and authorization procedure is required.

In a seventh aspect, alone or in combination with one or more of the first through sixth aspects, the one or more subscription parameters associated with the UAV UE include at least one of an IP address associated with the UAV UE, information associated with the USS device, a SUPI associated with the UAV UE, an application level UAV identifier associated with the UAV UE, or a network level UAV identifier associated with the UAV UE.

In an eighth aspect, alone or in combination with one or more of the first through seventh aspects, process 700 includes receiving, from the core network device, an indication that the authentication and authorization procedure is required for the UAV UE based at least in part on the subscription information being updated successfully; and storing a mapping between an application level UAV identifier associated with the UAV UE and a network level UAV identifier associated with the UAV UE based at least in part on receiving the indication that the authentication and authorization procedure is required.

In a ninth aspect, alone or in combination with one or more of the first through eighth aspects, transmitting, to the core network device, the indication of the one or more parameters comprises transmitting, to a PCF of the core network device, the indication of the one or more parameters.

In a tenth aspect, alone or in combination with one or more of the first through ninth aspects, process 700 includes transmitting, to the USS device, an indication of a network level UAV identifier associated with the UAV UE.

In an eleventh aspect, alone or in combination with one or more of the first through tenth aspects, performing the action to cause the core network device to initiate the authentication and authorization procedure with the UAV UE comprises receiving, from the USS device, an indication to perform the authentication and authorization procedure with the UAV UE.

In a twelfth aspect, alone or in combination with one or more of the first through eleventh aspects, performing the action to cause the core network device to initiate the authentication and authorization procedure with the UAV UE comprises transmitting, to the core network device, an indication to perform the authentication and authorization procedure with the UAV UE.

In a thirteenth aspect, alone or in combination with one or more of the first through twelfth aspects, transmitting, to the core network device, the indication to perform the authentication and authorization procedure with the UAV UE comprises transmitting an indication of at least one of an IP address associated with the UAV UE, information associated with the USS device, a SUPI associated with the UAV UE, an application level UAV identifier associated with the UAV UE, or a network level UAV identifier associated with the UAV UE.

In a fourteenth aspect, alone or in combination with one or more of the first through thirteenth aspects, transmitting, to the core network device, the indication to perform the authentication and authorization procedure with the UAV UE causes the core network device to initiate the authentication and authorization procedure.

In a fifteenth aspect, alone or in combination with one or more of the first through fourteenth aspects, transmitting, to the core network device, the indication to perform the authentication and authorization procedure with the UAV UE comprises transmitting, to an AMF of the core network device, the indication to perform the authentication and authorization procedure with the UAV UE.

In a sixteenth aspect, alone or in combination with one or more of the first through fifteenth aspects, process 700 includes participating in the authentication and authorization procedure with the core network device and the UAV UE based at least in part on performing the action to cause the core network device to initiate the authentication and authorization procedure with the UAV UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
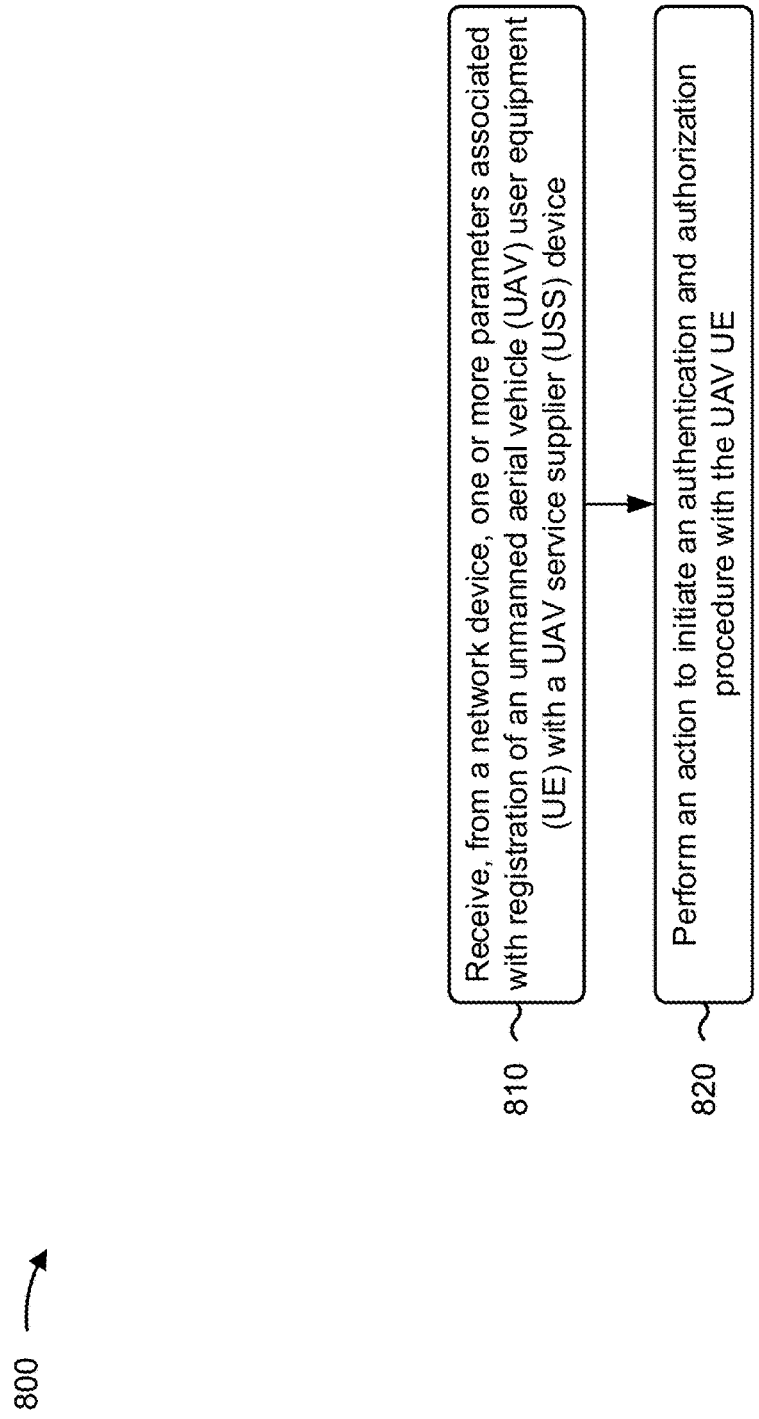

FIG. 8 is a diagram illustrating an example process 800 performed, for example, by a core network device, in accordance with the present disclosure. Example process 800 is an example where the core network device (e.g., core network device(s) 325) performs operations associated with triggering of a UAV authentication and authorization procedure.

As shown in FIG. 8, in some aspects, process 800 may include receiving, from a network device, one or more parameters associated with registration of a UAV UE with a USS device (block 810). For example, the core network device (e.g., using antenna 234, demodulator 232, MIMO detector 236, receive processor 238, controller/processor 240, and/or memory 242) may receive, from a network device, one or more parameters associated with registration of a UAV UE with a USS device, as described above.

As further shown in FIG. 8, in some aspects, process 800 may include performing an action to initiate an authentication and authorization procedure with the UAV UE (block 820). For example, the core network device (e.g., using transmit processor 220, TX MIMO processor 230, modulator 232, antenna 234, demodulator 232, MIMO detector 236, receive processor 238, controller/processor 240, memory 242, and/or scheduler 246) may perform an action to initiate an authentication and authorization procedure with the UAV UE, as described above.

Process 800 may include additional aspects, such as any single aspect or any combination of aspects described below and/or in connection with one or more other processes described elsewhere herein.

In a first aspect, process 800 includes performing an initial registration procedure with the UAV UE.

In a second aspect, alone or in combination with the first aspect, performing the initial registration procedure with the UAV UE comprises receiving, from the UAV UE, a registration request, determining, from subscription information associated with the UAV UE stored by the core network device, that the authentication and authorization procedure is not to be performed, determining, from the subscription information associated with the UAV UE, that the UAV UE is not authorized for aerial services provided by a network associated with the core network device, and establishing a PDU session, that is not dedicated for aerial services, for the UAV UE.

In a third aspect, alone or in combination with one or more of the first and second aspects, performing the initial registration procedure with the UAV UE comprises performing, by an AMF of the core network device, the initial registration procedure with the UAV UE.

In a fourth aspect, alone or in combination with one or more of the first through third aspects, receiving, from the network device, the one or more parameters associated with registration of the UAV UE with the USS device is based at least in part on performing the initial registration procedure with the UAV UE.

In a fifth aspect, alone or in combination with one or more of the first through fourth aspects, the one or more parameters associated with registration of the UAV UE with the USS device include at least one of an IP address associated with the UAV UE, information associated with the USS device, a SUPI associated with the UAV UE, an application level UAV identifier associated with the UAV UE, or a network level UAV identifier associated with the UAV UE.

In a sixth aspect, alone or in combination with one or more of the first through fifth aspects, receiving, from the network device, the one or more parameters associated with registration of the UAV UE with the USS device comprises receiving, by a PCF of the core network device and from the network device, an indication of the one or more parameters associated with registration of the UAV UE with the USS device.

In a seventh aspect, alone or in combination with one or more of the first through sixth aspects, process 800 includes updating, by the PCF of the core network device, the one or more parameters associated with registration of the UAV UE with the USS device in a UDR of the core network device.

In an eighth aspect, alone or in combination with one or more of the first through seventh aspects, process 800 includes transmitting, to the network device, an indication that the authentication and authorization procedure is required for the UAV UE based at least in part on updating the one or more parameters associated with registration of the UAV UE with the USS device in the UDR of the core network device.

In a ninth aspect, alone or in combination with one or more of the first through eighth aspects, performing the action to initiate the authentication and authorization procedure with the UAV UE comprises updating subscription information associated with the UAV UE to indicate that the authentication and authorization procedure is required based at least in part on receiving, from the network device, the one or more parameters associated with registration of the UAV UE with the USS device.

In a tenth aspect, alone or in combination with one or more of the first through ninth aspects, performing the action to initiate the authentication and authorization procedure with the UAV UE comprises performing, by an AMF of the core network device, an initial registration procedure with the UAV UE, determining, by the AMF of the core network device, that subscription information associated with the UAV UE has been updated to indicate that the authentication and authorization procedure is required, and initiating, by the AMF of the core network device, the authentication and authorization procedure with the UAV UE.

In an eleventh aspect, alone or in combination with one or more of the first through tenth aspects, initiating, by the AMF of the core network device, the authentication and authorization procedure with the UAV UE comprises transmitting, to the UAV UE, a configuration update indicating a permissible mobility area for the UAV UE and a request to register with the core network device for aerial services, and performing a registration procedure with the UAV UE to register the UAV UE, for aerial services, with a network associated with the core network device.

In a twelfth aspect, alone or in combination with one or more of the first through eleventh aspects, performing the registration procedure with the UAV UE to register the UAV UE, for aerial services, with the network associated with the core network device comprises receiving, from the UAV UE, an indication that the UAV UE is registering for aerial services in a NAS message.

In a thirteenth aspect, alone or in combination with one or more of the first through twelfth aspects, initiating, by the AMF of the core network device, the authentication and authorization procedure with the UAV UE is based at least in part on performing the registration procedure with the UAV UE to register the UAV UE, for aerial services, with the network associated with the core network device.

In a fourteenth aspect, alone or in combination with one or more of the first through thirteenth aspects, process 800 includes performing the authentication and authorization procedure with the UAV UE and the network device.

In a fifteenth aspect, alone or in combination with one or more of the first through fourteenth aspects, performing the action to initiate the authentication and authorization procedure with the UAV UE comprises receiving, from the network device, an indication to perform the authentication and authorization procedure with the UAV UE, and initiating the authentication and authorization procedure with the UAV UE.

In a sixteenth aspect, alone or in combination with one or more of the first through fifteenth aspects, the indication to perform the authentication and authorization procedure with the UAV UE indicates at least one of an IP address associated with the UAV UE, information associated with the USS device, a SUPI associated with the UAV UE, an application level UAV identifier associated with the UAV UE, or a network level UAV identifier associated with the UAV UE.

In a seventeenth aspect, alone or in combination with one or more of the first through sixteenth aspects, receiving, from the network device, the indication to perform the authentication and authorization procedure with the UAV UE is based at least in part on a request from the USS device to the network device to perform the authentication and authorization procedure.

In an eighteenth aspect, alone or in combination with one or more of the first through seventeenth aspects, initiating the authentication and authorization procedure with the UAV UE comprises transmitting, to the UAV UE, a configuration update indicating a permissible mobility area for the UAV UE and a request to register with the core network device for aerial services, and performing a registration procedure with the UAV UE to register the UAV UE, for aerial services, with a network associated with the core network device.

In a nineteenth aspect, alone or in combination with one or more of the first through eighteenth aspects, process 800 includes performing the authentication and authorization procedure with the UAV UE and the network device.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
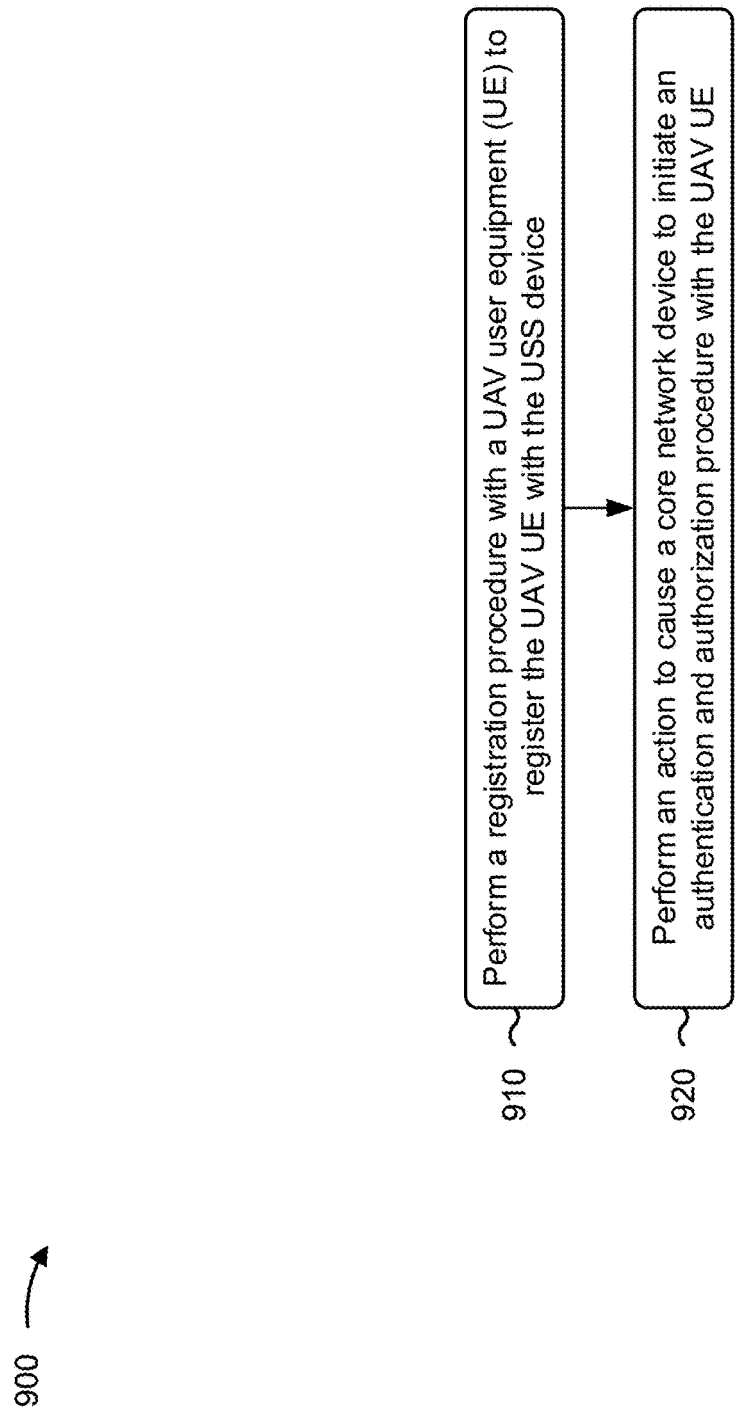

FIG. 9 is a diagram illustrating an example process 900 performed, for example, by a USS device, in accordance with the present disclosure. Example process 900 is an example where the USS device (e.g., USS device 315) performs operations associated with triggering of a UAV authentication and authorization procedure.

As shown in FIG. 9, in some aspects, process 900 may include performing a registration procedure with a UAV UE to register the UAV UE with the USS device (block 910). For example, the USS device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may perform a registration procedure with a UAV UE to register the UAV UE with the USS device, as described above.

As further shown in FIG. 9, in some aspects, process 900 may include performing an action to cause a core network device to initiate an authentication and authorization procedure with the UAV UE (block 920). For example, the USS device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may perform an action to cause a core network device to initiate an authentication and authorization procedure with the UAV UE, as described above.

Process 900 may include additional aspects, such as any single aspect or any combination of aspects described below and/or in connection with one or more other processes described elsewhere herein.

In a first aspect, performing the registration procedure with the UAV UE to register the UAV UE with the USS device comprises performing the registration procedure via a PDU session associated with a network associated with the core network device.

In a second aspect, alone or in combination with the first aspect, performing the registration procedure with the UAV UE to register the UAV UE with the USS device comprises assigning an application level UAV identifier to the UAV UE.

In a third aspect, alone or in combination with one or more of the first and second aspects, performing the registration procedure with the UAV UE to register the UAV UE with the USS device comprises receiving, from the UAV UE, an indication of a PLMN identifier associated with a network associated with the core network device.

In a fourth aspect, alone or in combination with one or more of the first through third aspects, performing the action to cause the core network device to initiate the authentication and authorization procedure with the UAV UE comprises transmitting, to a network device associated with the core network device, one or more parameters associated with a registration of the UAV UE with the USS device.

In a fifth aspect, alone or in combination with one or more of the first through fourth aspects, process 900 includes determining an address associated with the network device based at least in part on at least one of a PLMN identifier associated with a network associated with the core network device, or an IP address associated with the UAV UE.

In a sixth aspect, alone or in combination with one or more of the first through fifth aspects, the one or more parameters associated with a registration of the UAV UE with the USS device include at least one of an IP address associated with the UAV UE, information associated with the USS device, an application level UAV identifier associated with the UAV UE, or a PLMN identifier associated with a network associated with the core network device.

In a seventh aspect, alone or in combination with one or more of the first through sixth aspects, transmitting, to the network device associated with the core network device, the one or more parameters associated with the registration of the UAV UE with the USS device causes the network device to cause the core network device to update subscription information, associated with the UAV UE, to indicate that the authentication and authorization procedure is required.

In an eighth aspect, alone or in combination with one or more of the first through seventh aspects, process 900 includes receiving, from the network device, an indication of a network level UAV identifier associated with the UAV UE.

In a ninth aspect, alone or in combination with one or more of the first through eighth aspects, performing the action to cause the core network device to initiate the authentication and authorization procedure with the UAV UE comprises transmitting, to a network device associated with the core network device, an indication to perform the authentication and authorization procedure with the UAV UE.

In a tenth aspect, alone or in combination with one or more of the first through ninth aspects, the indication to perform the authentication and authorization procedure with the UAV UE causes the network device to provide an indication to an AMF of the core network device to initiate the authentication and authorization procedure with the UAV UE.

In an eleventh aspect, alone or in combination with one or more of the first through tenth aspects, the indication to perform the authentication and authorization procedure with the UAV UE indicates at least one of an IP address associated with the UAV UE, information associated with the USS device, an application level UAV identifier associated with the UAV UE, or a PLMN identifier associated with a network associated with the core network device.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
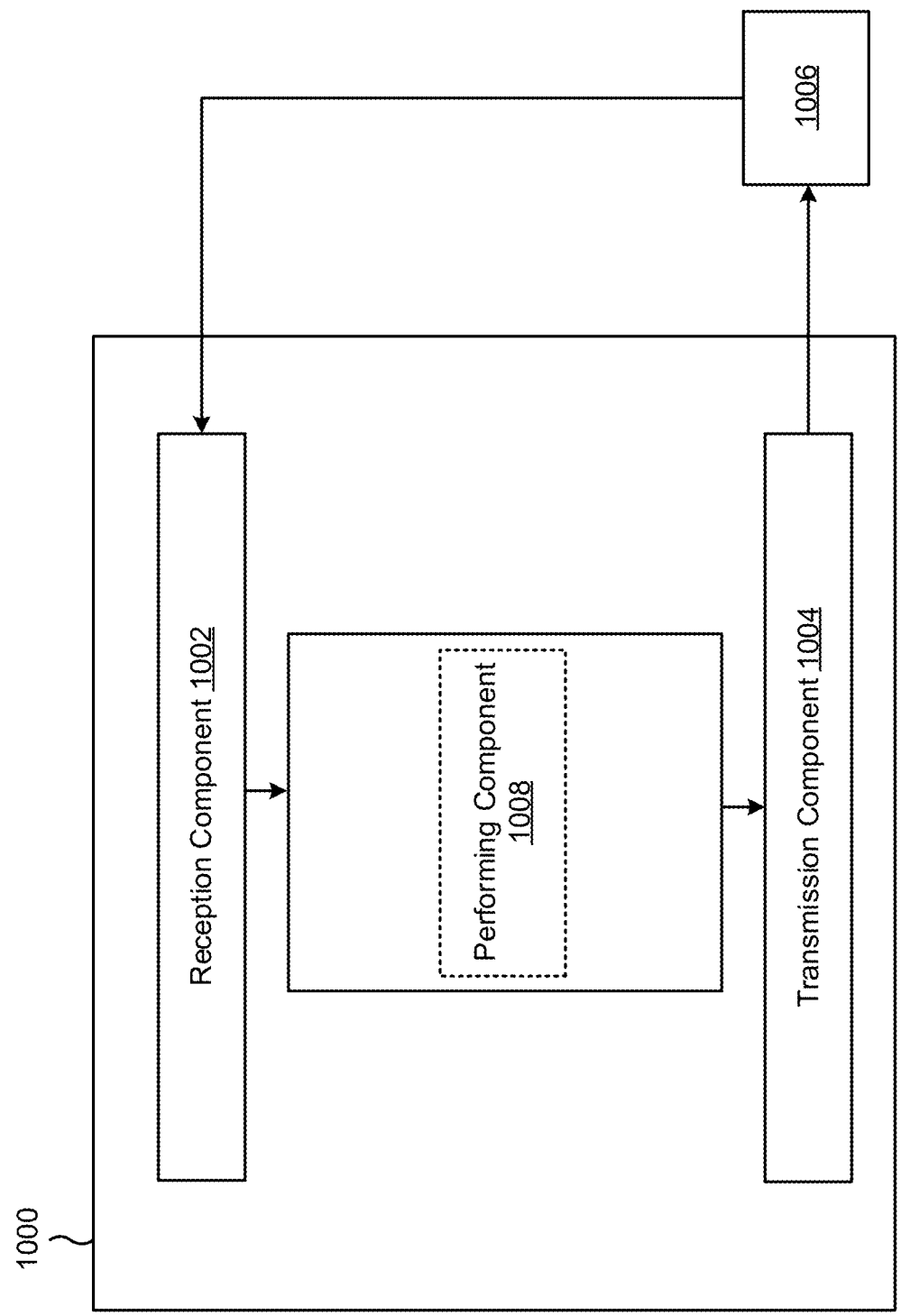
FIGS. 10-13 are block diagrams of example apparatuses for wireless communication, in accordance with the present disclosure.

FIG. 10 is a block diagram of an example apparatus 1000 for wireless communication. The apparatus 1000 may be a UAV UE, or a UAV UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a performing component 1008, among other examples.

In some aspects, the apparatus 1000 may be configured to perform one or more operations described herein in connection with FIGS. 4-5. Additionally, or alternatively, the apparatus 1000 may be configured to perform one or more processes described herein, such as process 600 of FIG. 6, or a combination thereof. In some aspects, the apparatus 1000 and/or one or more components shown in FIG. 10 may include one or more components of the UAV UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UAV UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component

1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UAV UE described above in connection with FIG. 2. In some aspects, the transmission component 1004 may be collocated with the reception component 1002 in a transceiver.

The performing component 1008 may perform a registration procedure with a USS device via a network connection to register with the USS device. In some aspects, the performing component 1008 may include one or more antennas, a demodulator, a MIMO detector, a receive processor, a modulator, a transmit MIMO processor, a transmit processor, a controller/processor, a memory, or a combination thereof, of the UAV UE described above in connection with FIG. 2. The performing component 1008 may perform a registration procedure with a core network device to register with a network associated with the core network device based at least in part on performing the registration procedure with the USS device. The reception component 1002 may receive, from the core network device, an indication to perform an authentication and authorization procedure only after performing the registration procedure with the USS device and after performing the registration procedure with the core network device.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
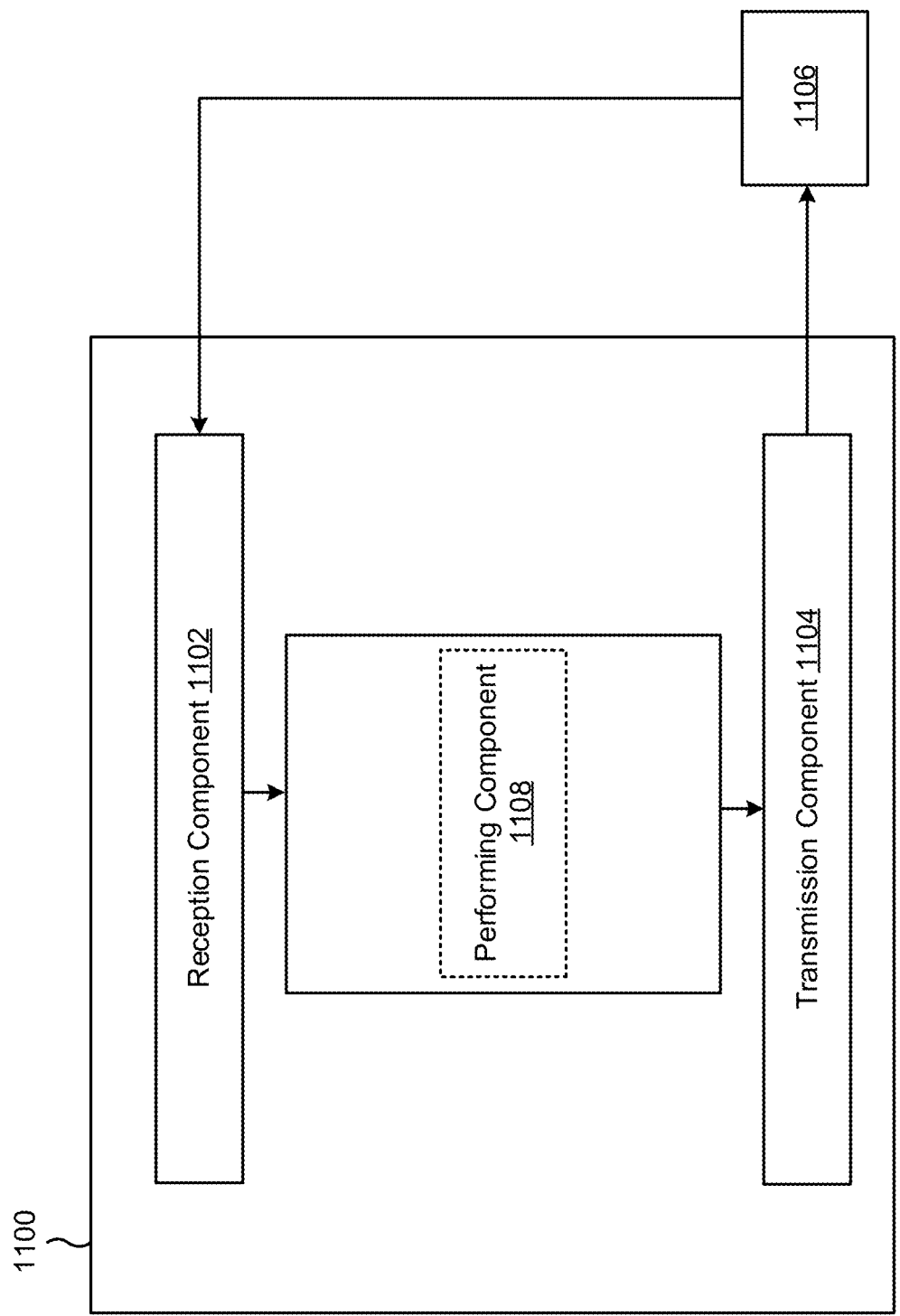

FIG. 11 is a block diagram of an example apparatus 1100 for wireless communication. The apparatus 1100 may be a network device, or a network device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a performing component 1108, among other examples.

In some aspects, the apparatus 1100 may be configured to perform one or more operations described herein in connection with FIGS. 4-5. Additionally, or alternatively, the apparatus 1100 may be configured to perform one or more processes described herein, such as process 700 of FIG. 7, or a combination thereof. In some aspects, the apparatus 1100 and/or one or more components shown in FIG. 11 may include one or more components of the network device described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the network device that is associated with the UFES described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the network device that is associated with the UFES described above in connection with FIG. 2. In some aspects, the transmission component 1104 may be collocated with the reception component 1102 in a transceiver.

The reception component 1102 may receive, from a USS device, one or more parameters associated with a registration of a UAV UE with the USS device. The performing component 1108 may perform an action to cause a core network device to initiate an authentication and authorization procedure with the UAV UE. In some aspects, the performing component 1108 may include one or more antennas, a demodulator, a MIMO detector, a receive processor, a modulator, a transmit MIMO processor, a transmit processor, a controller/processor, a memory, or a combination thereof, of the network device described above in connection with FIG. 2. In some aspects, the performing component 1108 may cause the reception component 1102 and/or the transmission component 1104 to perform an action to cause a core network device to initiate an authentication and authorization procedure with the UAV UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
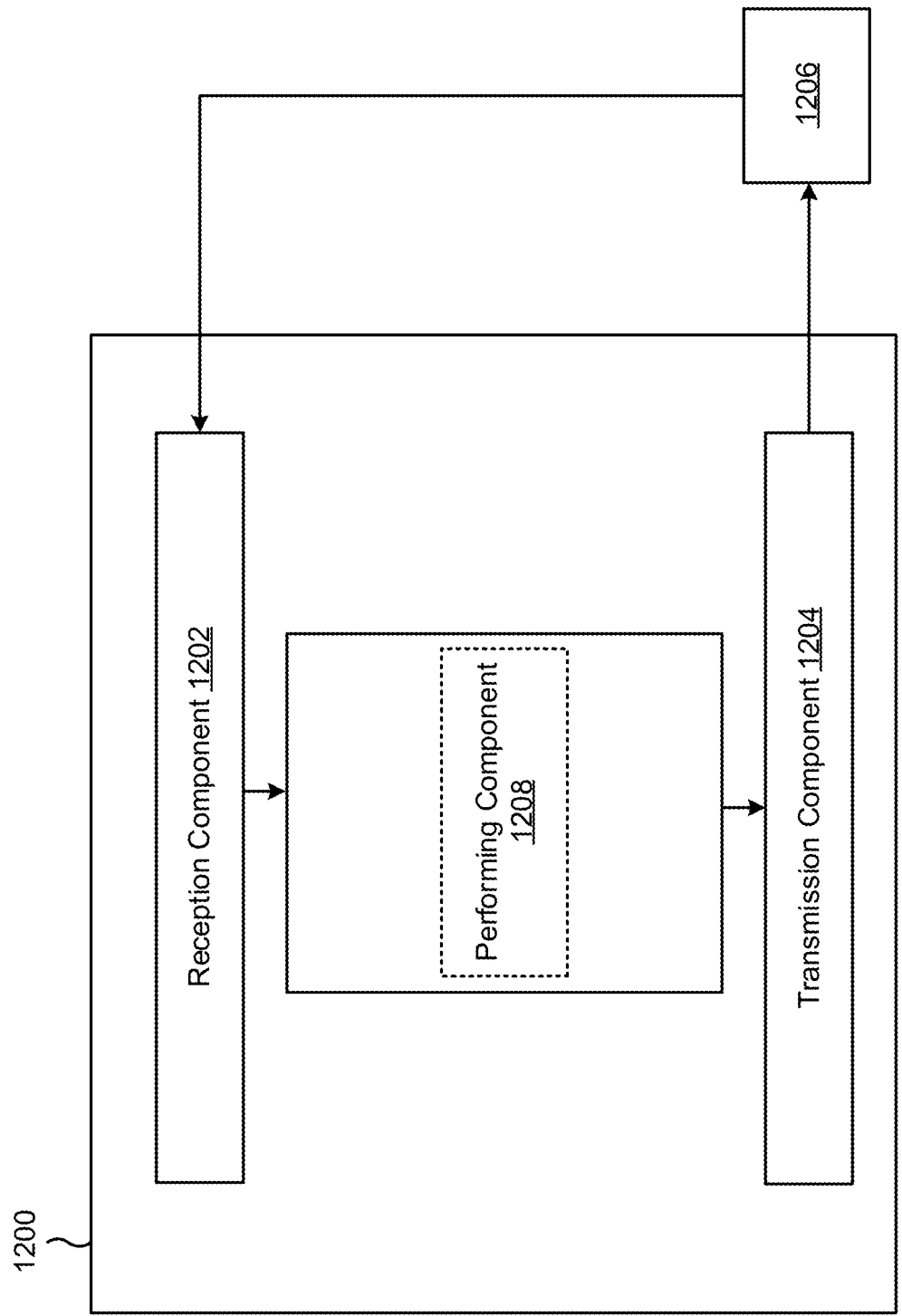

FIG. 12 is a block diagram of an example apparatus 1200 for wireless communication. The apparatus 1200 may be a core network device, or a core network device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a performing component 1208, among other examples.

In some aspects, the apparatus 1200 may be configured to perform one or more operations described herein in connection with FIGS. 4-5. Additionally, or alternatively, the apparatus 1200 may be configured to perform one or more processes described herein, such as process 800 of FIG. 8, or a combination thereof. In some aspects, the apparatus 1200 and/or one or more components shown in FIG. 12 may include one or more components of the core network device described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the core network device described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the core network device described above in connection with FIG. 2. In some aspects, the transmission component 1204 may be collocated with the reception component 1202 in a transceiver.

The reception component 1202 may receive, from a network device, one or more parameters associated with registration of a UAV UE with a UAV USS device. The performing component 1208 may perform an action to initiate an authentication and authorization procedure with the UAV UE. In some aspects, the performing component 1208 may include one or more antennas, a demodulator, a MIMO detector, a receive processor, a modulator, a transmit MIMO processor, a transmit processor, a controller/processor, a memory, or a combination thereof, of the core network device described above in connection with FIG. 2. In some aspects, the performing component 1208 may cause the reception component 1202 and/or the transmission component 1204 to perform an action to initiate an authentication and authorization procedure with the UAV UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
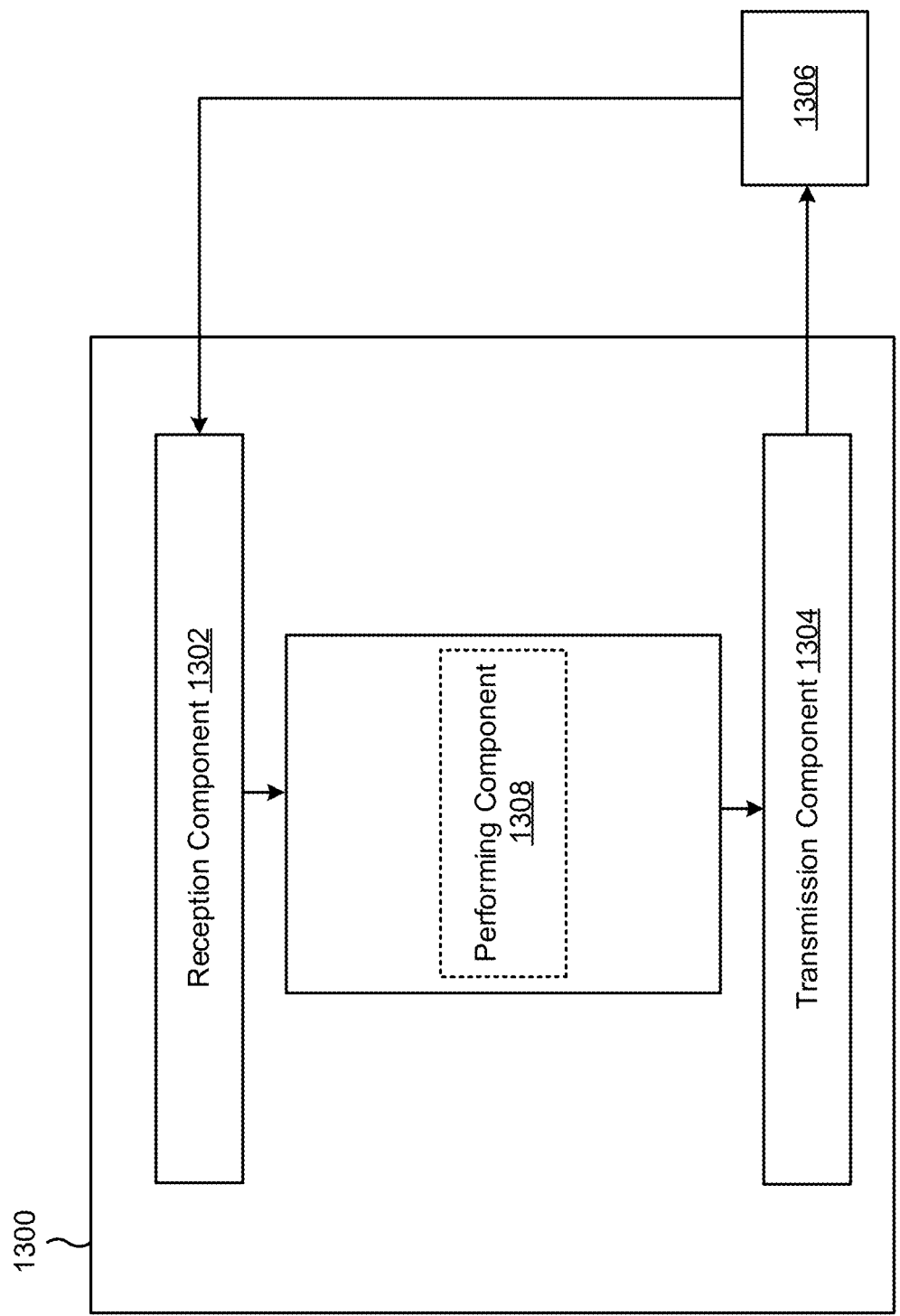

FIG. 13 is a block diagram of an example apparatus 1300 for wireless communication. The apparatus 1300 may be a USS device, or a USS device may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a performing component 1308, among other examples.

In some aspects, the apparatus 1300 may be configured to perform one or more operations described herein in connection with FIGS. 4-5. Additionally, or alternatively, the apparatus 1300 may be configured to perform one or more processes described herein, such as process 900 of FIG. 9, or a combination thereof. In some aspects, the apparatus 1300 and/or one or more components shown in FIG. 13 may include one or more components of the USS device described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the USS device described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the USS device described above in connection with FIG. 2. In some aspects, the transmission component 1304 may be collocated with the reception component 1302 in a transceiver.

The performing component 1308 may perform a registration procedure with a UAV UE to register the UAV UE with the USS device. In some aspects, the performing component 1308 may include one or more antennas, a demodulator, a MIMO detector, a receive processor, a modulator, a transmit MIMO processor, a transmit processor, a controller/processor, a memory, or a combination thereof, of the USS device described above in connection with FIG. 2. The performing component 1308 may perform an action to cause a core network device to initiate an authentication and authorization procedure with the UAV UE. In some aspects, the performing component 1308 may cause the reception component 1302 and/or the transmission component 1304 to perform an action to cause a core network device to initiate an authentication and authorization procedure with the UAV UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by an unmanned aerial vehicle (UAV) user equipment (UE), comprising: performing a registration procedure with a UAV service supplier (USS) device via a network connection to register with the USS device; performing a registration procedure with a core network device to register with a network associated with the core network device based at least in part on performing the registration procedure with the USS device; and receiving, from the core network device, an indication to perform an authentication and authorization procedure only after performing the registration procedure with the USS device and after performing the registration procedure with the core network device.

Aspect 2: The method of Aspect 1, further comprising: performing an initial registration procedure with the core network device to establish the network connection.

Aspect 3: The method of Aspect 2, wherein performing the initial registration procedure with the core network device to establish the network connection comprises: transmitting, to the core network device, a registration request that includes an indication of whether the UAV UE is registering for aerial services provided by the network; and establishing a protocol data unit (PDU) session associated with the network.

Aspect 4: The method of any of Aspects 1-3, wherein performing the registration procedure with the USS device comprises: transmitting, to the USS device via the network connection, an indication of a public land mobile network (PLMN) identifier associated with the network.

Aspect 5: The method of any of Aspects 1-4, wherein performing the registration procedure with the USS device comprises: receiving, from the USS device, an application level UAV identifier associated with the UAV UE.

Aspect 6: The method of any of Aspects 1-5, wherein performing the registration procedure with the core network device to register with the network associated with the core network device comprises: performing the registration procedure with an access and mobility management function (AMF) of the network.

Aspect 7: The method of any of Aspects 1-6, wherein performing the registration procedure with the core network device to register with the network associated with the core network device comprises: receiving, from the core network device, a request to initiate a registration procedure to register the UAV UE as a UAV with the network, wherein the request to initiate the registration procedure is based at least in part on performing the registration procedure with the USS device.

Aspect 8: The method of Aspect 7, wherein receiving, from the core network device, the request to initiate the registration procedure to register the UAV UE as a UAV with the network comprises: receiving the request to initiate the registration procedure from an access and mobility management function (AMF) of the network.

Aspect 9: The method of any of Aspects 1-8, wherein performing the registration procedure with the core network device to register with the network associated with the core network device comprises: receiving an indication of a network level UAV identifier associated with the UAV ID associated with aerial services provided by the network.

Aspect 10: The method of Aspect 9, wherein the network level UAV identifier is a general public subscription identifier.

Aspect 11: The method of any of Aspects 1-10, wherein performing the registration procedure with the core network device to register with the network associated with the core network device comprises: receiving an indication of a permissible mobility area for the UAV UE.

Aspect 12: The method of any of Aspects 1-11, wherein performing the registration procedure with the core network device to register with the network associated with the core network device comprises: transmitting a request to register with the network, wherein the request includes an indication that the UAV UE is registering for aerial services provided by the network.

Aspect 13: The method of Aspect 12, wherein the indication that the UAV UE is registering for aerial services is included in a non-access stratum (NAS) message.

Aspect 14: The method of any of Aspects 1-13, further comprising: transmitting a communication to cause an access and mobility management function (AMF) of the network to perform the authentication and authorization procedure.

Aspect 15: A method of wireless communication performed by a network device, comprising: receiving, from an unmanned aerial vehicle (UAV) service supplier (USS) device, one or more parameters associated with a registration of a UAV user equipment (UE) with the USS device; and performing an action to cause a core network device to initiate an authentication and authorization procedure with the UAV UE.

Aspect 16: The method of Aspect 15, wherein the one or more parameters associated with the registration of the UAV UE with the USS device include at least one of: an internet protocol (IP) address associated with the UAV UE, information associated with the USS device, an application level UAV identifier associated with the UAV UE, or a public land mobile network (PLMN) identifier associated with a network associated with the network device.

Aspect 17: The method of any of Aspects 15-16, further comprising: determining a subscription permanent identifier (SUPI) associated with the UAV UE based at least in part on the one or more parameters associated with the registration of the UAV UE with the USS device.

Aspect 18: The method of any of Aspects 15-17, further comprising: determining whether the UAV UE is associated with a network level UAV identifier based at least in part on a subscription permanent identifier (SUPI) associated with the UAV UE.

Aspect 19: The method of Aspect 18, further comprising: assigning a network level UAV identifier to the UAV UE based at least in part on determining that the UAV UE is not associated with a network level UAV identifier.

Aspect 20: The method of any of Aspects 18-19, further comprising: obtaining the network level UAV identifier associated with the UAV UE from a unified data management (UDM) component of the core network device based at least in part on determining that the UAV UE is associated with a network level UAV identifier.

Aspect 21: The method of any of Aspects 15-20, wherein performing the action to cause the core network device to initiate the authentication and authorization procedure with the UAV UE comprises: transmitting, to the core network device, an indication of one or more subscription parameters associated with the UAV UE, to cause the core network device to update subscription information associated with the UAV UE to indicate that the authentication and authorization procedure is required.

Aspect 22: The method of Aspect 21, wherein the one or more subscription parameters associated with the UAV UE include at least one of: an internet protocol (IP) address associated with the UAV UE, information associated with the USS device, a subscription permanent identifier (SUPI) associated with the UAV UE, an application level UAV identifier associated with the UAV UE, or a network level UAV identifier associated with the UAV UE.

Aspect 23: The method of any of Aspects 21-22, further comprising: receiving, from the core network device, an indication that the authentication and authorization procedure is required for the UAV UE based at least in part on the subscription information being updated successfully; and storing a mapping between an application level UAV identifier associated with the UAV UE and a network level UAV identifier associated with the UAV UE based at least in part on receiving the indication that the authentication and authorization procedure is required.

Aspect 24: The method of any of Aspects 21-23, wherein transmitting, to the core network device, the indication of the one or more parameters comprises: transmitting, to a policy control function (PCF) of the core network device, the indication of the one or more parameters.

Aspect 25: The method of any of Aspects 15-24, further comprising: transmitting, to the USS device, an indication of a network level UAV identifier associated with the UAV UE.

Aspect 26: The method of any of Aspects 15-25, wherein performing the action to cause the core network device to initiate the authentication and authorization procedure with the UAV UE comprises: receiving, from the USS device, an indication to perform the authentication and authorization procedure with the UAV UE.

Aspect 27: The method of Aspect 26, wherein performing the action to cause the core network device to initiate the authentication and authorization procedure with the UAV UE comprises: transmitting, to the core network device, an indication to perform the authentication and authorization procedure with the UAV UE.

Aspect 28: The method of Aspect 27, wherein transmitting, to the core network device, the indication to perform the authentication and authorization procedure with the UAV UE comprises: transmitting an indication of at least one of: an internet protocol (IP) address associated with the UAV UE, information associated with the USS device, a subscription permanent identifier (SUPI) associated with the UAV UE, an application level UAV identifier associated with the UAV UE, or a network level UAV identifier associated with the UAV UE.

Aspect 29: The method of any of Aspects 27-28, wherein transmitting, to the core network device, the indication to perform the authentication and authorization procedure with the UAV UE causes the core network device to initiate the authentication and authorization procedure.

Aspect 30: The method of any of Aspects 27-29, wherein transmitting, to the core network device, the indication to perform the authentication and authorization procedure with the UAV UE comprises: transmitting, to an access and mobility management function (AMF) of the core network device, the indication to perform the authentication and authorization procedure with the UAV UE.

Aspect 31: The method of any of Aspects 15-30, further comprising: participating in the authentication and authorization procedure with the core network device and the UAV UE based at least in part on performing the action to cause the core network device to initiate the authentication and authorization procedure with the UAV UE.

Aspect 32: A method of wireless communication performed by a core network device, comprising: receiving, from a network device, one or more parameters associated with registration of an unmanned aerial vehicle (UAV) user equipment (UE) with a UAV service supplier (USS) device; and performing an action to initiate an authentication and authorization procedure with the UAV UE.

Aspect 33: The method of Aspect 32, further comprising: performing an initial registration procedure with the UAV UE.

Aspect 34: The method of Aspect 33, wherein performing the initial registration procedure with the UAV UE comprises: receiving, from the UAV UE, a registration request; determining, from subscription information associated with the UAV UE stored by the core network device, that the authentication and authorization procedure is not to be performed; determining, from the subscription information associated with the UAV UE, that the UAV UE is not authorized for aerial services provided by a network associated with the core network device; and establishing a protocol data unit (PDU) session, that is not dedicated for aerial services, for the UAV UE.

Aspect 35: The method of any of Aspects 33-34, wherein performing the initial registration procedure with the UAV UE comprises: performing, by an access and mobility management function (AMF) of the core network device, the initial registration procedure with the UAV UE.

Aspect 36: The method of any of Aspects 33-35, wherein receiving, from the network device, the one or more parameters associated with registration of the UAV UE with the USS device is based at least in part on performing the initial registration procedure with the UAV UE.

Aspect 37: The method of any of Aspects 32-36, wherein the one or more parameters associated with registration of the UAV UE with the USS device include at least one of: an internet protocol (IP) address associated with the UAV UE, information associated with the USS device, a subscription permanent identifier (SUPI) associated with the UAV UE, an application level UAV identifier associated with the UAV UE, or a network level UAV identifier associated with the UAV UE.

Aspect 38: The method of any of Aspects 32-37, wherein receiving, from the network device, the one or more parameters associated with registration of the UAV UE with the USS device comprises: receiving, by a policy control function (PCF) of the core network device and from the network device, an indication of the one or more parameters associated with registration of the UAV UE with the USS device.

Aspect 39: The method of Aspect 38, further comprising: updating, by the PCF of the core network device, the one or more parameters associated with registration of the UAV UE with the USS device in a unified data repository (UDR) of the core network device.

Aspect 40: The method of Aspect 39, further comprising: transmitting, to the network device, an indication that the authentication and authorization procedure is required for UAV UE based at least in part on updating the one or more parameters associated with registration of the UAV UE with the USS device in the UDR of the core network device.

Aspect 41: The method of any of Aspects 32-40, wherein performing the action to initiate the authentication and authorization procedure with the UAV UE comprises: updating subscription information associated with the UAV UE to indicate that the authentication and authorization procedure is required based at least in part on receiving, from the network device, the one or more parameters associated with registration of the UAV UE with the USS device.

Aspect 42: The method of any of Aspects 32-41, wherein performing the action to initiate the authentication and authorization procedure with the UAV UE comprises: determining, by the AMF of the core network device, that subscription information associated with the UAV UE has been updated to indicate that the authentication and authorization procedure is required; and initiating, by the AMF of the core network device, the authentication and authorization procedure with the UAV UE.

Aspect 43: The method of Aspect 42, wherein initiating, by the AMF of the core network device, the authentication and authorization procedure with the UAV UE comprises: transmitting, to the UAV UE, a configuration update indicating a permissible mobility area for the UAV UE and a request to register with the core network device for aerial services; and performing a registration procedure with the UAV UE to register the UAV UE, for aerial services, with a network associated with the core network device.

Aspect 44: The method of Aspect 43, wherein performing the registration procedure with the UAV UE to register the UAV UE, for aerial services, with the network associated with the core network device comprises: receiving, from the UAV UE, an indication that the UAV UE is registering for aerial services in a non-access stratum (NAS) message.

Aspect 45: The method of any of Aspects 43-44, wherein initiating, by the AMF of the core network device, the authentication and authorization procedure with the UAV UE is based at least in part on performing the registration procedure with the UAV UE to register the UAV UE, for aerial services, with the network associated with the core network device.

Aspect 46: The method of any of Aspects 42-45, further comprising: performing the authentication and authorization procedure with the UAV UE and the network device.

Aspect 47: The method of any of Aspects 32-46, wherein performing the action to initiate the authentication and authorization procedure with the UAV UE comprises: receiving, from the network device, an indication to perform the authentication and authorization procedure with the UAV UE; and initiating the authentication and authorization procedure with the UAV UE.

Aspect 48: The method of Aspect 47, wherein the indication to perform the authentication and authorization procedure with the UAV UE indicates at least one of: an internet protocol (IP) address associated with the UAV UE, information associated with the USS device, a subscription permanent identifier (SUPI) associated with the UAV UE, an application level UAV identifier associated with the UAV UE, or a network level UAV identifier associated with the UAV UE.

Aspect 49: The method of any of Aspects 47-48, wherein receiving, from the network device, the indication to perform the authentication and authorization procedure with the UAV UE is based at least in part on a request from the USS device to the network device to perform the authentication and authorization procedure.

Aspect 50: The method of any of Aspects 47-49, wherein initiating the authentication and authorization procedure with the UAV UE comprises: transmitting, to the UAV UE, a configuration update indicating a permissible mobility area for the UAV UE and a request to register with the core network device for aerial services; and performing a registration procedure with the UAV UE to register the UAV UE, for aerial services, with a network associated with the core network device.

Aspect 51: The method of any of Aspects 47-50, further comprising: performing the authentication and authorization procedure with the UAV UE and the network device.

Aspect 52: A method of wireless communication performed by an unmanned aerial vehicle (UAV) service supplier (USS) device, comprising: performing a registration procedure with a UAV user equipment (UE) to register the UAV UE with the USS device; and performing an action to cause a core network device to initiate an authentication and authorization procedure with the UAV UE.

Aspect 53: The method of Aspect 52, wherein performing the registration procedure with the UAV UE to register the UAV UE with the USS device comprises: performing the registration procedure via a protocol data unit (PDU) session associated with a network associated with the core network device.

Aspect 54: The method of any of Aspects 52-53, wherein performing the registration procedure with the UAV UE to register the UAV UE with the USS device comprises: assigning an application level UAV identifier to the UAV UE.

Aspect 55: The method of any of Aspects 52-54, wherein performing the registration procedure with the UAV UE to register the UAV UE with the USS device comprises: receiving, from the UAV UE, an indication of a public land mobile network (PLMN) identifier associated with a network associated with the core network device.

Aspect 56: The method of any of Aspects 52-55, wherein performing the action to cause the core network device to initiate the authentication and authorization procedure with the UAV UE comprises: transmitting, to a network device associated with the core network device, one or more parameters associated with a registration of the UAV UE with the USS device.

Aspect 57: The method of Aspect 56, further comprising: determining an address associated with the network device based at least in part on at least one of: a public land mobile network (PLMN) identifier associated with a network associated with the core network device, or an internet protocol (IP) address associated with the UAV UE.

Aspect 58: The method of any of Aspects 56-57, wherein the one or more parameters associated with a registration of the UAV UE with the USS device include at least one of: an internet protocol (IP) address associated with the UAV UE, information associated with the USS device, an application level UAV identifier associated with the UAV UE, or a public land mobile network (PLMN) identifier associated with a network associated with the core network device.

Aspect 59: The method of any of Aspects 56-58, wherein transmitting, to the network device associated with the core network device, the one or more parameters associated with the registration of the UAV UE with the USS device causes the network device to cause the core network device to update subscription information, associated with the UAV UE, to indicate that the authentication and authorization procedure is required.

Aspect 60: The method of any of Aspects 56-59, further comprising: receiving, from the network device, an indication of a network level UAV identifier associated with the UAV UE.

Aspect 61: The method of any of Aspects 52-60, wherein performing the action to cause the core network device to initiate the authentication and authorization procedure with the UAV UE comprises: transmitting, to a network device associated with the core network device, an indication to perform the authentication and authorization procedure with the UAV UE.

Aspect 62: The method of Aspect 61, wherein the indication to perform the authentication and authorization procedure with the UAV UE causes the network device to provide an indication to an access and mobility management function (AMF) of the core network device to initiate the authentication and authorization procedure with the UAV UE.

Aspect 63: The method of any of Aspects 61-62, wherein the indication to perform the authentication and authorization procedure with the UAV UE indicates at least one of: an internet protocol (IP) address associated with the UAV UE, information associated with the USS device, an application level UAV identifier associated with the UAV UE, or a public land mobile network (PLMN) identifier associated with a network associated with the core network device.

Aspect 64: An apparatus for wireless communication at a device, comprising a processor; memory coupled with the processor; and instructions stored in the memory and executable by the processor to cause the apparatus to perform the method of one or more of Aspects 1-14.

Aspect 65: A device for wireless communication, comprising a memory and one or more processors coupled to the memory, the one or more processors configured to perform the method of one or more of Aspects 1-14.

Aspect 66: An apparatus for wireless communication, comprising at least one means for performing the method of one or more of Aspects 1-14.

Aspect 67: A non-transitory computer-readable medium storing code for wireless communication, the code comprising instructions executable by a processor to perform the method of one or more of Aspects 1-14.

Aspect 68: A non-transitory computer-readable medium storing a set of instructions for wireless communication, the set of instructions comprising one or more instructions that, when executed by one or more processors of a device, cause the device to perform the method of one or more of Aspects 1-14.

Aspect 69: An apparatus for wireless communication at a device, comprising a processor; memory coupled with the processor; and instructions stored in the memory and executable by the processor to cause the apparatus to perform the method of one or more of Aspects 15-31.

Aspect 70: A device for wireless communication, comprising a memory and one or more processors coupled to the memory, the one or more processors configured to perform the method of one or more of Aspects 15-31.

Aspect 71: An apparatus for wireless communication, comprising at least one means for performing the method of one or more of Aspects 15-31.

Aspect 72: A non-transitory computer-readable medium storing code for wireless communication, the code comprising instructions executable by a processor to perform the method of one or more of Aspects 15-31.

Aspect 73: A non-transitory computer-readable medium storing a set of instructions for wireless communication, the set of instructions comprising one or more instructions that, when executed by one or more processors of a device, cause the device to perform the method of one or more of Aspects 15-31.

Aspect 74: An apparatus for wireless communication at a device, comprising a processor; memory coupled with the processor; and instructions stored in the memory and executable by the processor to cause the apparatus to perform the method of one or more of Aspects 32-51.

Aspect 75: A device for wireless communication, comprising a memory and one or more processors coupled to the memory, the one or more processors configured to perform the method of one or more of Aspects 32-51.

Aspect 76: An apparatus for wireless communication, comprising at least one means for performing the method of one or more of Aspects 32-51.

Aspect 77: A non-transitory computer-readable medium storing code for wireless communication, the code comprising instructions executable by a processor to perform the method of one or more of Aspects 32-51.

Aspect 78: A non-transitory computer-readable medium storing a set of instructions for wireless communication, the set of instructions comprising one or more instructions that, when executed by one or more processors of a device, cause the device to perform the method of one or more of Aspects 32-51.

Aspect 79: An apparatus for wireless communication at a device, comprising a processor; memory coupled with the processor; and instructions stored in the memory and executable by the processor to cause the apparatus to perform the method of one or more of Aspects 52-63.

Aspect 80: A device for wireless communication, comprising a memory and one or more processors coupled to the memory, the one or more processors configured to perform the method of one or more of Aspects 52-63.

Aspect 81: An apparatus for wireless communication, comprising at least one means for performing the method of one or more of Aspects 52-63.

Aspect 82: A non-transitory computer-readable medium storing code for wireless communication, the code comprising instructions executable by a processor to perform the method of one or more of Aspects 52-63.

Aspect 83: A non-transitory computer-readable medium storing a set of instructions for wireless communication, the set of instructions comprising one or more instructions that, when executed by one or more processors of a device, cause the device to perform the method of one or more of Aspects 52-63.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network device, comprising:
   receiving, from an unmanned aerial vehicle (UAV) service supplier (USS) device, an indication of a completed registration of a UAV user equipment (UE) with the USS device, and one or more parameters associated with the completed registration of the UAV UE with the USS device;
   determining a subscription permanent identifier (SUPI) associated with the UAV UE based at least in part on the one or more parameters associated with the completed registration of the UAV UE with the USS device; and
   performing, based on receiving, from the USS, the one or more parameters associated with the completed registration of the UAV UE with the USS device, an action to cause a core network device to initiate an authentication and authorization procedure with the UAV UE.

2. The method of claim 1, further comprising:
   determining whether the UAV UE is associated with a network level UAV identifier based at least in part on the SUPI associated with the UAV UE;
   assigning the network level UAV identifier to the UAV UE based at least in part on determining that the UAV UE is not associated with the network level UAV identifier; and obtaining the network level UAV identifier associated with the UAV UE from a unified data management (UDM) component of the core network device based at least in part on determining that the UAV UE is associated with the network level UAV identifier.

3. The method of claim 1, wherein performing the action to cause the core network device to initiate the authentication and authorization procedure with the UAV UE comprises:

transmitting, to the core network device, an indication of one or more subscription parameters associated with the UAV UE, to cause the core network device to update subscription information associated with the UAV UE to indicate that the authentication and authorization procedure is required.

4. The method of claim 3, further comprising:

receiving, from the core network device, an indication that the authentication and authorization procedure is required for the UAV UE based at least in part on the subscription information being updated successfully; and storing a mapping between an application level UAV identifier associated with the UAV UE and a network level UAV identifier associated with the UAV UE based at least in part on receiving the indication that the authentication and authorization procedure is required.

5. The method of claim 1, further comprising:

transmitting, to the USS device, an indication of a network level UAV identifier associated with the UAV UE.

6. The method of claim 1, wherein performing the action to cause the core network device to initiate the authentication and authorization procedure with the UAV UE comprises:

receiving, from the USS device, an indication to perform the authentication and authorization procedure with the UAV UE.

7. The method of claim 6, wherein performing the action to cause the core network device to initiate the authentication and authorization procedure with the UAV UE comprises:

transmitting, to the core network device, an indication to perform the authentication and authorization procedure with the UAV UE, wherein transmitting, to the core network device, the indication to perform the authentication and authorization procedure with the UAV UE causes the core network device to initiate the authentication and authorization procedure.

8. A method of wireless communication performed by a core network device, comprising:

receiving, from a network device, an indication of a completed registration of an unmanned aerial vehicle (UAV) user equipment (UE) with a UAV service supplier (USS) device, and one or more parameters associated with the completed registration of the UAV UE with the USS device; and performing, based on receiving, from the USS, the one or more parameters, comprising at least a subscription permanent identifier (SUPI) associated with the UAV UE, associated with the completed registration of the UAV UE with the USS device, an action to initiate an authentication and authorization procedure with the UAV UE.

9. The method of claim 8, further comprising:

receiving, from the UAV UE, a registration request;

determining, from subscription information associated with the UAV UE stored by the core network device, that the authentication and authorization procedure is not to be performed;

determining, from the subscription information associated with the UAV UE, that the UAV UE is not authorized for aerial services provided by a network associated with the core network device; and establishing a protocol data unit (PDU) session, that is not dedicated for aerial services, for the UAV UE.

10. The method of claim 9, wherein receiving, from the network device, the one or more parameters associated with registration of the UAV UE with the USS device is based at least in part on performing an initial registration procedure with the UAV UE.

11. The method of claim 8, wherein performing the action to initiate the authentication and authorization procedure with the UAV UE comprises:

updating subscription information associated with the UAV UE to indicate that the authentication and authorization procedure is required based at least in part on receiving, from the network device, the one or more parameters associated with registration of the UAV UE with the USS device.

12. The method of claim 8, wherein performing the action to initiate the authentication and authorization procedure with the UAV UE comprises:

determining, by an access and mobility function (AMF) of the core network device, that subscription information associated with the UAV UE has been updated to indicate that the authentication and authorization procedure is required; and initiating, by the AMF of the core network device, the authentication and authorization procedure with the UAV UE.

13. The method of claim 8, wherein performing the action to initiate the authentication and authorization procedure with the UAV UE comprises:

receiving, from the network device, an indication to perform the authentication and authorization procedure with the UAV UE; and initiating the authentication and authorization procedure with the UAV UE.

14. The method of claim 13, wherein receiving, from the network device, the indication to perform the authentication and authorization procedure with the UAV UE is based at least in part on a request from the USS device to the network device to perform the authentication and authorization procedure.

15. The method of claim 13, wherein initiating the authentication and authorization procedure with the UAV UE comprises:

transmitting, to the UAV UE, a configuration update indicating a permissible mobility area for the UAV UE and a request to register with the core network device for aerial services;

transmitting, to the UAV UE, a configuration update indicating a permissible mobility area for the UAV UE and a request to register with the core network device for aerial services; and performing a registration procedure with the UAV UE to register the UAV UE, for aerial services, with a network associated with the core network device.

16. A network device for wireless communication, comprising:
- one or more memories; and
- one or more processors, coupled to the one or more memories, which are configured, individually or in any combination, to:
  - receive, from an unmanned aerial vehicle (UAV) service supplier (USS) device, an indication of a completed registration of a UAV user equipment (UE) with the USS device, and one or more parameters associated with the completed registration of the UAV UE with the USS device;
  - determine a subscription permanent identifier (SUPI) associated with the UAV UE based at least in part on the one or more parameters associated with the completed registration of the UAV UE with the USS device; and
  - perform, based on receiving, from the USS, the one or more parameters associated with the completed registration of the UAV UE with the USS device, an action to cause a core network device to initiate an authentication and authorization procedure with the UAV UE.

17. The network device of claim 16, wherein the one or more processors are further configured to:
- determine whether the UAV UE is associated with a network level UAV identifier based at least in part on the SUPI associated with the UAV UE;
- assign the network level UAV identifier to the UAV UE based at least in part on determining that the UAV UE is not associated with the network level UAV identifier; and
- obtain the network level UAV identifier associated with the UAV UE from a unified data management (UDM) component of the core network device based at least in part on determining that the UAV UE is associated with the network level UAV identifier.

18. The network device of claim 16, wherein the one or more processors, to perform the action to cause the core network device to initiate the authentication and authorization procedure with the UAV UE, are configured to:
- transmit, to the core network device, an indication of one or more subscription parameters associated with the UAV UE, to cause the core network device to update subscription information associated with the UAV UE to indicate that the authentication and authorization procedure is required.

19. The network device of claim 18, wherein the one or more processors are further configured to:
- receive, from the core network device, an indication that the authentication and authorization procedure is required for the UAV UE based at least in part on the subscription information being updated successfully; and
- store a mapping between an application level UAV identifier associated with the UAV UE and a network level UAV identifier associated with the UAV UE based at least in part on receiving the indication that the authentication and authorization procedure is required.

20. The network device of claim 16, wherein the one or more processors are further configured to:
- transmit, to the USS device, an indication of a network level UAV identifier associated with the UAV UE.

21. The network device of claim 16, wherein the one or more processors, to perform the action to cause the core network device to initiate the authentication and authorization procedure with the UAV UE, are configured to:
- receive, from the USS device, an indication to perform the authentication and authorization procedure with the UAV UE.

22. The network device of claim 21, wherein the one or more processors, to perform the action to cause the core network device to initiate the authentication and authorization procedure with the UAV UE, are configured to:
- transmit, to the core network device, an indication to perform the authentication and authorization procedure with the UAV UE, wherein transmitting, to the core network device, the indication to perform the authentication and authorization procedure with the UAV UE causes the core network device to initiate the authentication and authorization procedure.

23. A core network device for wireless communication, comprising:
- one or more memories; and
- one or more processors, coupled to the one or more memories, which are configured, individually or collectively to:
  - receive, from a network device, an indication of a completed registration of an unmanned aerial vehicle (UAV) user equipment (UE) with a UAV service supplier (USS) device, and one or more parameters associated with the completed registration of the UAV UE with the USS device;
  - determine a subscription permanent identifier (SUPI) associated with the UAV UE based at least in part on the one or more parameters associated with the completed registration of the UAV UE with the USS device; and
  - perform, based on receiving, from the USS, the one or more parameters associated with the completed registration of the UAV UE with the USS device, an action to initiate an authentication and authorization procedure with the UAV UE.

24. The core network device of claim 23, wherein the one or more processors are further configured to:
- receive, from the UAV UE, a registration request;
- determine, from subscription information associated with the UAV UE stored by the core network device, that the authentication and authorization procedure is not to be performed;
- determine, from the subscription information associated with the UAV UE, that the UAV UE is not authorized for aerial services provided by a network associated with the core network device; and
- establish a protocol data unit (PDU) session, that is not dedicated for aerial services, for the UAV UE.

25. The core network device of claim 24, wherein receiving, from the network device, the one or more parameters associated with registration of the UAV UE with the USS device is based at least in part on performing an initial registration procedure with the UAV UE.

26. The core network device of claim 23, wherein the one or more processors, to perform the action to initiate the authentication and authorization procedure with the UAV UE, are configured to:
- update subscription information associated with the UAV UE to indicate that the authentication and authorization procedure is required based at least in part on receiving, from the network device, the one or more parameters associated with registration of the UAV UE with the USS device.

27. The core network device of claim 23, wherein the one or more processors, to perform the action to initiate the authentication and authorization procedure with the UAV UE, are configured to:
  determine, by an access and mobility function (AMF), that subscription information associated with the UAV UE has been updated to indicate that the authentication and authorization procedure is required; and
  initiate, by the AMF, the authentication and authorization procedure with the UAV UE.

28. The core network device of claim 23, wherein the one or more processors, to perform the action to initiate the authentication and authorization procedure with the UAV UE, are configured to:
  receive, from the network device, an indication to perform the authentication and authorization procedure with the UAV UE; and
  initiate the authentication and authorization procedure with the UAV UE.

29. The core network device of claim 28, wherein receiving, from the network device, the indication to perform the authentication and authorization procedure with the UAV UE is based at least in part on a request from the USS device to the network device to perform the authentication and authorization procedure.

30. The core network device of claim 28, wherein the one or more processors, to initiate the authentication and authorization procedure with the UAV UE, are configured to:
  transmit, to the UAV UE, a configuration update indicating a permissible mobility area for the UAV UE and a request to register with the core network device for aerial services; and
  perform a registration procedure with the UAV UE to register the UAV UE, for aerial services, with a network associated with the core network device.

\* \* \* \* \*